(12) United States Patent
Suguta

(10) Patent No.: US 6,901,579 B1
(45) Date of Patent: *May 31, 2005

(54) GENERATION OF SOURCE CODE FROM CLASSES AND MAINTAINING THE COMMENT THAT INDICATES THE ROLE OF THE CLASS IN THE GENERATED SOURCE CODE

(75) Inventor: Shigeki Suguta, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/840,231

(22) Filed: Apr. 11, 1997

(30) Foreign Application Priority Data

Nov. 7, 1996 (JP) ............................................. 8-294700

(51) Int. Cl.$^7$ ................................................. G06F 9/44
(52) U.S. Cl. ...................................................... 717/108
(58) Field of Search ................................ 395/701, 702, 395/705; 717/2

(56) References Cited

U.S. PATENT DOCUMENTS 5,325,533 A * 6/1994 McInerney et al. ......... 395/701
5,758,160 A * 5/1998 McInerney et al. ......... 395/701

OTHER PUBLICATIONS

Design Patterns Elements of Reusable Object Oriented Software Gamma et al. pp. 1–51, 79–136, 1994.*
Object–Oriented Computer Construction, Jim Holmes pp. six–24, Nov. 29, 1994.*
The Design and Evolution of CH. Bjarne Stroustrup Chapters 0,1,2,3,4,12,13,14, Mar. 9, 1994.*
Dictionar of Object Technology, Donald Firesmith et al pp. 56–91, 115, 189–211, 322–329, Sep. 22, 1995.*
Forte Software "A Guide to the Forte Workshop" manual, Jun. 1994.*
Template Software Development Environment for the SNAP programming language release 7.0, 1995.*
"Compilers Principles, Techniques, and Tools", Aho et al. Chapters 1–5, Sep. 1985.*
"Principles of Object–Oriented Analysis and Design", James Martin, Jun. 1, 1992, pp. 188–189, 367–370.*
"Compilers Principles, Techniques and Tols", Alfred V. Aho et al, Sep. 12, 1985, p. 54.*
"Three Models for the Description language", Noam Chomsky, IRE Trans. Inform. Theory p 113–124, 1956.*
"C++ Programming Language" Third Edition, p. 201–202, Bjarne Stroustrup, Jul. 7, 1997.*
"How Computers Work", Ron White, 2002, pp. 3–9, 19–23.*
Template Software User's Guide Development Evironment, 1995, 2–29.*

* cited by examiner

Primary Examiner—T. D. Ingberg
(74) Attorney, Agent, or Firm—Staas & Halsey LLP

(57) ABSTRACT

An apparatus for automatically generating an object-oriented language program which comprises a class definition storing unit, a parsing unit, a generation pattern description storing unit and a program generating unit. The class definition unit describes and stores the class definition. The parsing unit obtains structure information by parsing a class definition input from the class definition unit. The generation pattern description storing unit stores the generation pattern description for structuring the information obtained from the class definition. The program generating unit automatically generates a new object-oriented program from structure information of the parsing unit and the generation pattern. Additionally, both the structure information and the information possessed by a class included in a pattern description in a program to be generated, are verified. As a result, it can be verified whether or not the generated program includes a definition which conflicts with an existing program immediately after the generation of the program, without waiting for the compiling of the generated program.

25 Claims, 33 Drawing Sheets

```
class Name ;     //NAME CLASS
class Section ;  //TITLE CLASS
class Employee { //CLASS REPRESENTING EMPLOYEES INFORMATION
private :
    int       employee_id ; //EMPLOYEE NUMBER
    Name *    name ;        //:NAME
    Section * belong_to ;   //BELONG-TO JOB SECTION
};
```

FIG. 1   PRIOR ART

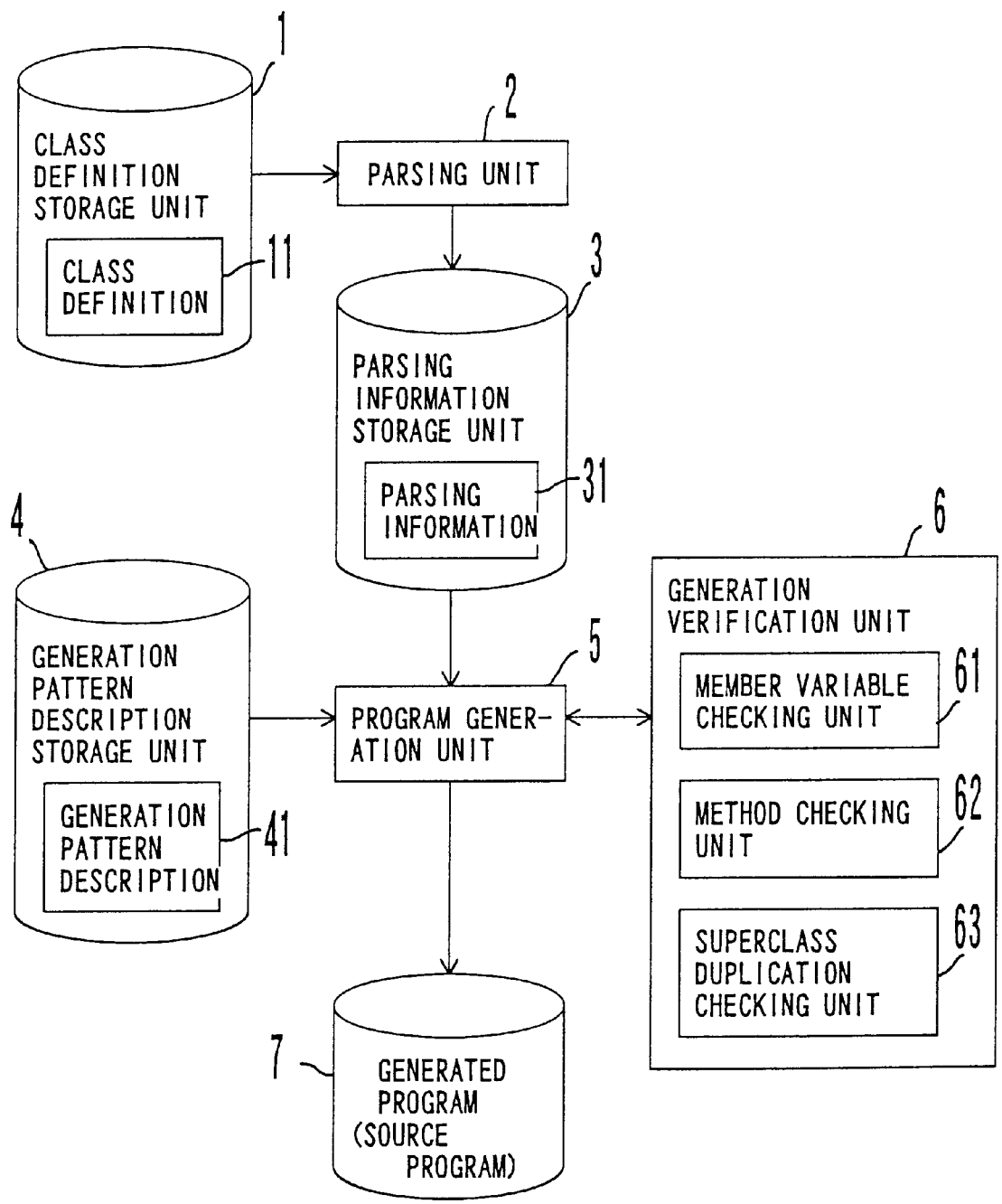
F I G. 3

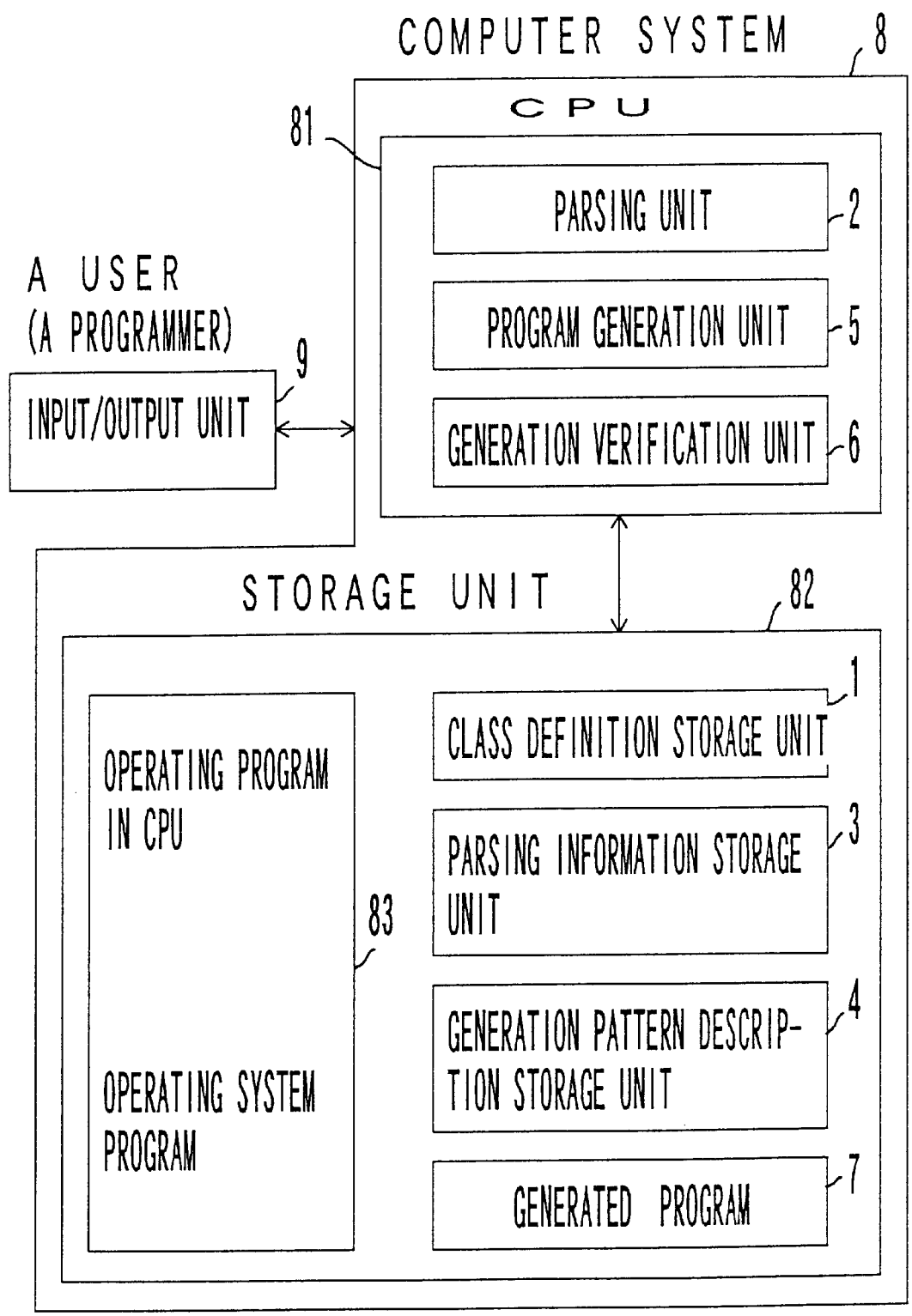
F I G. 4

```
class A : public B, C { //!!sample class void mf ( int ) ;   //!!sample memf
void mf ( int, int ) ;

int a ;   //!!sample date mem
} ;

int f ( ) { //!!sample func

```
PATTERN_NAME   TaskPattern
PATTERN_ELEMENTS_LIST {
    $taskname   Input   # USER INPUTS WHEN GENERATING
    $app_class  File    # DEFINE WITH GENERATION INSTRUCTION COMMENTS DURING INPUT FILE
}
RULES_OUTPUT_DESTINATION_LIST {
    generate_main       $taskname_main.cc'
    generate_man_hdr    $taskname_man.h'
    generate_man_body   $taskname_man.cc'
    generate_app_hdr    $app_class_gen.h'
    generate_app_body   $app_class_gen.cc'
}
```

FIG. 7B

```
generate_main {
    # OUTPUT TILL PRINT_END
    # VARIABLE STARTING WITH $ IS CONVERTED TO ITS VALUE WHEN OUTPUTTING
    !! PRINT_BEGIN;
    int main () {
        $taskname_man * controller = new $taskname_man();
        if (!controller) return 1;
        controller->Mainloop();
        return 0;
    }
    !! PRINT_END;
}
```

FIG. 7C

```
generate_man_hdr {
    !!PRINT_BEGIN;
    //TASK MANAGEMENT PERFORM PROCESSING SUCH AS COMMUNICATION NOT INCLUDED IN APPLICATION
    class $taskname_man : public TaskMan {
    public :
        $taskname_man ();  // CONSTRUCTOR
    private :
        $app_class * apl;  // POINTER TO APPLICATION
    };
    !!PRINT_END;
}
```

```
class App1 { //!!Pattern(TaskPattern, $app_class)
public:
    void f();
}
```

FIG.7D

```
// TASK MANAGEMENT PERFORM PROCESSING SUCH AS COMMUNICATION
//    NOT INCLUDED IN AN APPLICATION
class T_man : public TaskMan {
public:
    T_man() ; // CONSTRUCTOR
private:
    App1 * apl; // POINTER TO APPLICATION
};
```

FIG.7E

FIG. 8A
```
$x = 100 ;    # SET VARIABLE x TO 100
```

FIG. 8B
```
$class = "XXX" ;
$func = "f" ;
!!PRINT_BEGIN ;
    int $class :: $func ( ) {
    return 0 ;
    } ;
!!PRINT_END ;
```

FIG. 8C
```
int XXX :: f ( ) {
    return 0 ;
    } ;
```

FIG. 8D
```
!!IF ( $ x == 100 ) {
    $y = 10 ;
    }
!!ELSE {
    $y = 1 ;
    }
```

FIG. 8E
```
!!FORALL $elm !!IN  LIST {
    !!PRINT_BEGIN ;
        $elm ;
    !!PRINT_END ;
    }
```

FIG.12A

```
COPY_INITIALIZATION_SPECIFIER_GENERATION ($mem) {
    $mem_type = !!type_string($mem);
    #INITIALIZATION SPECIFIER FOR A CLASS OBJECT
    !!IF ($mem_type == 'user_defined') {
        !!PRINT_BEGIN;
            $mem(src.$mem),
        !!PRINT_END;
    }
    ...
}
```

FIG.12B

```
COPY_FORMAT_GENERATION ($mem) {
    $mem_type = !!type_string($mem);
    #CONVERSION RULES FOR INTEGER TYPE
    !!IF ($mem_type == 'int') {
        !!PRINT_BEGIN;
            $mem = src.$mem ;
        !!PRINT_END;
    }
    #CONVERSION RULES FOR char*
    !!IF ($mem_type == 'char *') {
        #CHECK WHETHER OR NOT COMMENTS IS "has-a"
        !!IF ( !!comment_check($mem, 'has-a') ) {
            !!PRINT_BEGIN;
                if ( src.$mem == (char*)0 ) { // IN THE CASE OF NULL POINTER
                    $mem = (char*)0;
                }
                else { //WHEN DATA EXIST
                    $mem = new char[ strlen( src.$mem ) + 1];
                    strcpy($mem, src.$mem);
                }
            !!PRINT_END ;
        }
        !!ELSE {
            !!PRINT_BEGIN;
                $mem = src.$mem;
            !!PRINT_END;
        }
    }
    ...
}
```

```
DECLARATION_OF_COPY_CONSTRUCTOR ($class) {
!!PRINT_BEGIN;
    $class (const $class&);
!!PRINT_END;
}
```

FIG. 13

```
GENERATION_OF_COPY_CONSTRUCTOR ($class) {
!!PRINT_BEGIN;
    $class :: $class ( const $class & src ) :
!!PRINT_END ;
# COPY OF MEMBER USING AN INITIALIZATION SPECIFIER
!!FORALL $mem !!IN !!member_vars ( $class ) {
    !!GENERATION OF COPY INITIALIZATION SPECIFIER ($mem)
    }

# COPY OF MEMBER IN THE CASE OF NOT USING AN INITIALIZATION SPECIFIER
!!FORALL $mem !!IN !!member_vars ( $class ) {
    !!GENERATION OF COPY FORMAT ($mem)
    }
}
```

F I G. 14

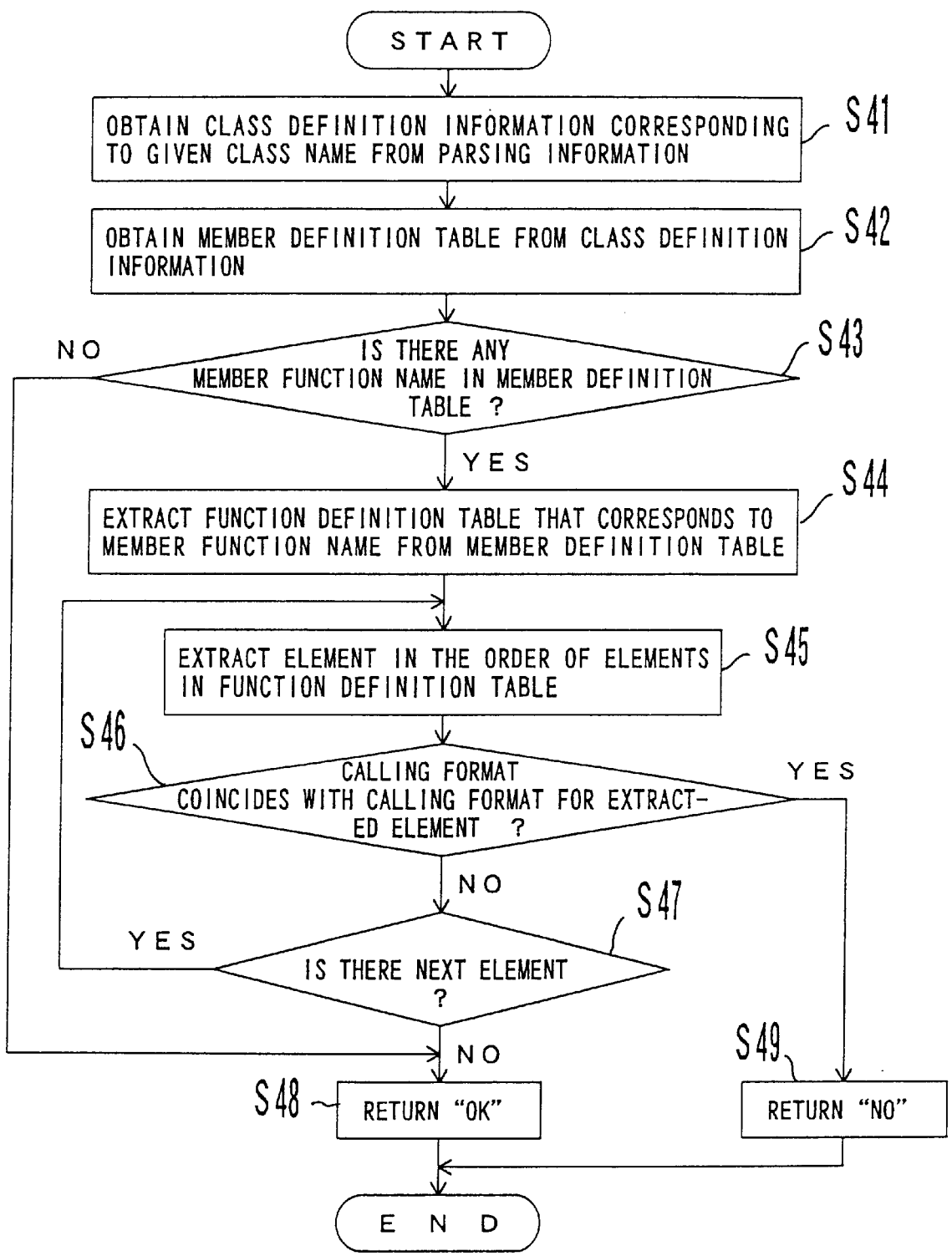
F I G. 1 6

```
MEMBER_ADDITION($class, $new_mem_name, $new_mem_type) {
    !!IF ( !!check_member ( $class, $new_mem_name ) == OK ) {
    !!IF PRINT_BEGIN ;
        $new_mem_type  $new_mem_name ;
    !!PRINT_END ;
    }
    !!ELSE { error ( $mem ) }
}
```

FIG. 18

```
class A {
private :
    int f1 ( int );  //!!called_when_param_is ( 1,2,3 )
    int f2 ( int );  //!!called_when_param_is ( 4 )
    int f3 ( int );  //!!called_when_param_is ( 5,6 )
    void other_func ( );
} ;
```

FIG. 19

```
generate_caller ( $class ) {
!!PRINT_BEGIN:
int $class :: f0 ( int select, int real_param ) {
    switch (select) {
!!PRINT_END ;

!!FORALL $mf !!IN !!mem_funcs ( $class ) {
!!IF ( !!comment_check ( $mf, 'called_when_param_is' ) ) {
    #VALUES ARE EXTRACTED FROM COMMENTS AND ARE PROCESSED ALL OF VALUES EXTRACTED
    !!FORALL $val
        !!IN !!comment_params( $mf, 'called_when_param_is' ) {
!!PRINT_BEGIN:
case $val:
!!PRINT_END ;
}
#GENERATION OF CALLING PROCESS FOR MEMBER FUNCTION
!!PRINT_BEGIN:
    return $mf ( real_param ) ;
    break;
!!PRINT_END;
}
!!PRINT_BEGIN:
default:
    cerr << "Illegal argument" << endl;
    break;
!!PRINT_END ;
}
    return -1 ;
}
!!PRINT_END ;
}
```

F I G. 20

```
COPY_CONSTRUCTOR_DECLARATION ($class) {
#CHECK FUNCTION NAME (IN THIS CASE SAME AS CLASS NAME), AND LIST OF ARGUMENTS
!!IF (!!check_method($class, "$class(const $class&)")) == OK {
!!PRINT_BEGIN;
     $class (const $class &);
!!PRINT_END;
}
!!ELSE (!!error("$class (const $class &)") )
}
```

FIG. 21

```
GENERATION_OF_OUTPUT_FUNCTION ($class) {
    #GENERATION OF FUNCTIONS HEADER
    !!PRINT_BEGIN;
        void $class :: print( ostream & os ) {
        os << "$class" ( << endl ;
    !!PRINT_END;
    #CHECK WHETHER OR NOT BASE CLASS EXISTS
    !!IF (!!base_check($class))) {
    # PROCESSING FOR ALL BASE CLASSES
    !!FORALL $base !!IN !!base_classes($class) ) {
        !!PRINT_BEGIN;
            $base :: print(os) ;
        !!PRINT_END;
    }

# PROCESSING FOR ALL BASE MEMBERS
    !!FORALL $mem !!IN !!member_vars($class) )
    {
        MEMBER OUTPUT ($mem)
    }
    !!PRINT_BEGIN;
        os << " " )" << endl;
    !!PRINT_END;
}
```

FIG. 22

```
BASE_CLASS_ADDITION ($class, $baseclass) {
  !!IF (!!check_duplicate($class, $baseclass) != OK) {
    !!warning("duplicate member");
  }
  !!replace_header("class $class : public $baseclass")
}
```

FIG. 23

```
BASE_CLASS_ADDITION( $class, $new_base ) {
    #CHECK WHETHER OR NOT BASE CLASS EXISTS
    !!IF ( !!base_check( $class ) ) {
    #CHECK FOR ALL BASE CLASSES
        !!FORALL $base !!IN !!base_classes( $class ) {
            !!IF ( !!check_duplicate ( $base, $new_base ) != OK ) {
                !!error ("multiple inheritance duplicate") ;
                !!EXIT ;
            }
        }
    }
    !!IF ( !!check_duplicate ( $class, $new_base ) != OK ) {
        !!warning ("duplicate member") ;
    }
    !!add_base_list ( $new_base ) ; // ADD TO BASE CLASS LIST
}
```

FIG. 24

```
class Element {
public :
    virtual void accept ( Processor * ) ;
} ;
    :

class E1 : public Element {
public :
    virtual void accept (Processor * p) { p -> process_E1 (this) ; } ;
} ;
    :
class Em : public Element {
public :
    virtual void accept (Processor * p) { p -> process_Em (this) ; } ;
} ;
```

FIG. 25

```
class Processor {
public :
    virtual void process_E1 ( Element * ) ;
       :
    virtual void process_Em ( Element * ) ;
} ;

class P1 : public Processor {
public :
    virtual void process_E1 ( Element * ) ;
       :
    virtual void process_Em ( Element * ) ;
} ;
       :
class Pn : public Pocessor {
public :
    virtual void process_E1 ( Element * ) ;
       :
    virtual void process_Em ( Element * ) ;
} ;
```

FIG. 26

```
PATTERN_NAME   Visitor

GENERATION_RULES_OUTPUT_DESTINATION_DEFINITION {

Element_GENERATION               'Element.h'

Element_DECLARATION_ADDITION     $infile.'_gen.h'

Processor_GENERATION             'Processor.h'

Processor_DECLARATION_ADDITION   $infile.'_gen.h'

}
```

F I G. 27

```
Element_GENERATION {
!!PRINT_BEGIN;
class Element {
public:
    virtual void accept(Processor *);
!!PRINT_END;
};
}
```

FIG. 28A

```
Element_DECLARATION_ADDITION ($class) {
!!Element_INHERITANCE      ($class) ;
!!accept_ADDITION          ($class) ;
}
```

FIG. 28B

```
Processor_DECLARATION_ADDITION($class) {
!!Processor_INHERITANCE         ($class) ;
!!Processor_FUNCTION_DECLARATION_ADDITION ($class) ;
}
```

FIG. 28C

```
class E1 { // !!Visitor_Element
} ;
    :
class En { // !!Visitor_Element
} ;

class P1 { // !!Visitor_Processor

} ;
    :
class Pn { // !!Visitor_Processor

} ;
```

F I G. 29

```
Element_INHERITANCE ($class) {
    !!IF ( !!comment_check ( $class, 'Visitor_Element' ) ) {
        !!replace_header ( " class $class : public Element " )
    }
}
```

FIG. 31

```
accept_ADDITION ($class) {
    !!IF ( !!comment_check($class, 'Visitor_Element' ) ) {
        !!PRINT_BEGIN ;
            virtual void accept (Processor * p) { p ->process $class (this) ; }
        !!PRINT_END ;
}}
```

FIG. 32

```
Processor _ GENERATION {
!!PRINT_BEGIN ;
    class Processor {
    public :
!!PRINT_END ;
!!FORALL $class !!IN !!all_classes ( ) {
!!IF ( !!comment_check ( $class, 'Visitor_Element' ) ) {
    !!PRINT_BEGIN ;
        virtual void process_$class ( Element * ) ;
    !!PRINT_END ;
}
!!PRINT_BEGIN ;
} ;
!!PRINT_END ;
}
```

FIG. 33

```
Processor_INHERITANCE ($class) {
    !!IF ( !!comment_check ( $class, 'Visitor_Processor' ) ) {
        !!replace_header ( "class $class : public Processor" )
    } }
```

F I G. 34

```
Processor_FUNCTION_DECLARATION_ADDITION ($class) {
    !!IF ( !!comment_check ( $class, 'Visitor_Processor' ) ) {
        !!FORALL $elmclass !!IN !!all_classes () {
            !!IF ( !!comment_check ( $elmclass, 'Visitor_Element' ) ) {
                !!PRINT_BEGIN ;
                    virtual void process_$elmclass ( Element * ) ;
                !!PRINT_END ;
            }
        } }
}
```

F I G. 35

```
Element_METHOD_CHECK
!!FORALL $class !!IN !!all_classes ( ) {
  !!IF ( !!comment_check ( $class, 'Visitor_Processor' ) &&
       !!comment_check ( $class, 'Request_Element_method' ) ) {
    $mfname = !!comment_param ($class, 'Request_Element_method' );
    !!FORALL $class !!IN !!all_classes ( ) {
      # CONFIRMATION AS TO WHETHER OR NOT ELEMENT SIDE HAS A REQUIRED MEMBER FUNCTION
      !!IF ( !!comment_check ( $class, 'Visitor_Element' ) &&
            !!check_method ( $class, $mfname ) != OK ) ) {
        # WHEN THERE IS NO REQUIRED MEMBER FUNCTION, WARNING IS ISSUED
        !!warning ("$class does not have $mfname ) ;;
      }
    }
  }
}
```

FIG. 36

GENERATION OF SOURCE CODE FROM CLASSES AND MAINTAINING THE COMMENT THAT INDICATES THE ROLE OF THE CLASS IN THE GENERATED SOURCE CODE

BACKGROUND OF THE INVENTION

1. Field of the Invention

The present invention relates to an automatic object-oriented programming language program generation apparatus for automatically developing part of a program for improving productivity in developing the program using an object-oriented programming language, an automatic generation method of the program, and a storage medium for storing the method of the program.

2. Description of the Related Art

Conventionally, there has been no automatic object-oriented programming language program generating technique such as that developed by the present invention.

Since a function called a "copy constructor" to be defined by a user is prepared in an object-oriented programming language C++, the explanation about the conventional technique using the copy constructor function will be provided next.

FIG. 1 shows a class definition representing information about employees when a user generates a program using one type of the object-oriented programming language C++.

With the object-oriented programming language C++, the object which has the class definition shown in FIG. 1 is structured as shown in FIG. 2A. When the object having the structure shown in FIG. 2A is copied by using the copy constructor function which is originally provided by C++, whereby the user does not define the copy constructor, a copy constructor is automatically generated which initializes an object for each member unit, and the object having the structure shown on the right side of FIG. 2B is obtained from the copy constructor function. In FIG. 2B, although the section of the object is the same, the object is renamed when copied by the copy constructor. The pointers of an original object and the copied object both point to the same section and at the same name.

The name of the copied object in FIG. 2B is generated separately from that of the original object, and the pointers of the original object and copied object must differ from each other as shown in FIG. 2C. However, it is impossible to generate the pointers which point to separate names when an object is copied using the automatically generated copy constructor provided by the C++ language. Accordingly, the user must define the copy constructor when the user wants to copy the object in the format as shown in FIG. 2C.

One technique for facilitating a description of a program under development, in order to improve the productivity in developing a program, is using a macro.

When a macro is used, one macro instruction allows a sequence of a plurality of instructions to be included in a program. If a portion of a program to be repeatedly used is given a suitable name in advance, and registered, the registered sequence of instructions can be included by specifying this name in the program whenever necessary.

However, a programmer must define a sequence of instructions which is to be set in advance and corresponds to a macro instruction, as a macro definition, before he or she includes the macro instruction in a program for using the macro. With the macro definition, the macro instruction is translated into a sequence of instructions which is preregistered, and a plurality of instructions can be is compiled.

When a macro instruction is used to improve the productivity in program generation, it is possible to specify parameters so that a sequence of instructions or part of the program can be changed and used. Basically, however, only a process for simply replacing one instruction with a plurality of instructions is performed.

In other words, the replacement process only makes a replacement according to the contents of a macro function which is programmed beforehand, and the contents are specified by parameters, that is, a simple replacement of a character string.

Accordingly, if an argument has a complicated structure such as an object when a program is generated using an object-oriented programming language, not only the simple examination of a character string, but also the examination of the internal structure of the object must be made in order to generate a program based on such a structure. Therefore, it was impossible to apply the conventional method of using a macro to this case.

Although there is a problem that the definitions of a newly generated program conflict with the definitions of an existing program, a conflict in the definitions cannot be verified when the program is newly generated (by replacing one instruction with a plurality of instructions) using a conventional macro technique in an object-oriented programming language.

Such conflict cannot be verified when a program is generated, that is, before the program is compiled. It can be verified based on the results of program compilation etc. Accordingly, there is a problem in automatic generation of an object-oriented progrmming language program with a method using a simple replacement technique such as a macro.

SUMMARY OF THE INVENTION

A first object of the present invention is to enable automatic generation of a copy constructor in an object-oriented programming language program which enables duplication of an object. Conventionally, such a program as shown in FIG. 2C must be made by a user. A second object of the present invention is to enable verification of whether or not an automatically generated program would include a definition which conflicts with that of an existing program when the program is generated. A third object of the present invention is improving the productivity of program development by enabling automatic generation of an object-oriented program.

According to the present invention, automatically generating a object-oriented program by defining new programming definitions based on the original programming definitions, making generation pattern descriptions for generating program patterns using the original programming definitions and the new programming definition, generating a new object-oriented program from the generation pattern descriptions with the structure information extracted from class definitions which were defined by a user, can be performed.

A relationship between a plurality of classes for generating a pattern of the object-oriented language is described and stored as a generation pattern description; structure information about an input class definition is obtained by analyzing its syntax; and the structure information of the class definition is used as the description of the relationship between the plurality of classes, so that the object-oriented programming language program can automatically be generated.

Relationships between classes for programming object-oriented program patterns are previously described and stored, and a class definition to be inputted is parsed to obtain its structural information, and structure information about input class definitions in the description of class interrelations is made available, thereby enabling automatic programming of an object-oriented programming language program.

Furthermore, according to the present invention, both information of a class definition input when a program is generated, and information of a class included in a pattern description of the program to be generated, can be examined, so that whether or not the program includes a definition which conflicts with an existing program can be verified when generating the program, without compiling or executing the generated program.

The productivity in the generation of an object-oriented programming language program can be improved by automatically generating the object-oriented programming language program, and verifying any conflict in the definitions of the generated program, according to the present invention.

BRIEF DESCRIPTION OF THE DRAWINGS

FIG. 1 exemplifies a class definition which is written in an object-oriented programming language C++;

FIG. 3 shows the principle of the embodiment;

FIG. 4 is a block diagram showing the entire configuration of this embodiment;

FIG. 5 shows an example of an input program that will be an input class definition;

FIG. 7A exemplifies a user input pattern element list, and a generation rule output destination definition list included in a generating pattern description;

FIGS. 7B and 7C exemplify descriptions of general generation rules included in the generation pattern description;

FIG. 7D exemplifies an input class definition;

FIG. 7E exemplifies a program output by executing the general generation rules shown in FIG. 7C;

FIG. 8A exemplifies an assignment statement used in executable statements of a generation rule;

FIG. 8B exemplifies a line output start statement and a line output end statement used in executable statements of a generation rule;

FIG. 8C exemplifies a resultant output of the line output start statement and line output end statement that are shown in FIG. 8B;

FIG. 8D exemplifies a conditional branch statement used in executable statements of a generation rule;

FIG. 8E exemplifies a list element repetition statement used in executable statements of a generation rule;

FIG. 12A exemplifies a copy initialization specifier generation rule in a data member conversion rule which defines a copy constructor function;

FIG. 12B exemplifies a copy format generation rule in the data member conversion rule which defines the copy constructor function;

FIG. 13 exemplifies a declaration addition rule in the copy constructor;

FIG. 14 exemplifies a member function generation rule in the copy constructor;

FIG. 16 is a flowchart showing a process performed by a method checking unit;

FIG. 18 exemplifies the declaration addition rule including a function for calling the data member checking unit;

FIG. 19 exemplifies a pattern description for writing variation of generation by using information of a member function;

FIG. 20 exemplifies a member function generation rule for written variation of generation by using the information of the member function;

FIG. 21 exemplifies a declaration addition rule including a function for checking multiple definitions of a method;

FIG. 22 exemplifies a member function generation rule when an output function for outputting the entire contents of data members in a class is generated;

FIG. 23 exemplifies a declaration adding rule including a warning function for warning of overwriting of a member of an existing class;

FIG. 24 exemplifies a declaration addition rule including a function for warning of a conflict with an existing definition;

FIG. 25 exemplifies a class definition of "Element";

FIG. 26 exemplifies a class definition on a "Processor" side which performs a process;

FIG. 27 exemplifies a rule output destination definition for a "Visitor pattern";

FIG. 28A exemplifies a general generation rule included in a generation pattern description of the "Visitor pattern";

FIGS. 28B and 28C exemplify declaration addition rules of the generation pattern description of the "Visitor pattern";

FIG. 29 shows the example in which a process content in a generation pattern description is specified by a comment;

FIG. 31 exemplifies a declaration addition rule when an "Element" is inherited;

FIG. 32 exemplifies a declaration addition rule when an "accept" function is added;

FIG. 33 exemplifies a general generation rule when a "Processor" is generated;

FIG. 34 exemplifies a declaration addition rule for "Processor" inheritance;

FIG. 35 exemplifies a declaration addition rule for a "Processor" function declaration generation; and FIG. 36 exemplifies an auxiliary function;

DESCRIPTION OF THE PREFERRED EMBODIMENT

Figure 2A:
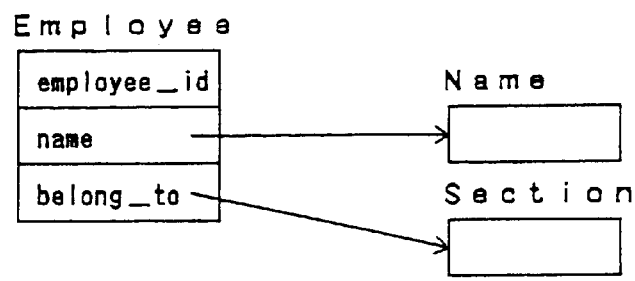
FIG. 2A shows the structure of the class definition shown in FIG. 1.
Figure 2B:
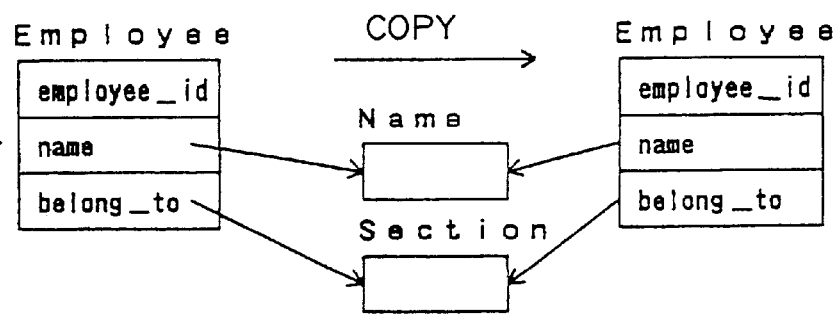
FIG. 2B shows the structure of the class definition shown in FIG. 1 which is normally processed by using a copy constructor function of C++.

Provided below is the explanation about a preferred embodiment according to the present invention.

FIG. 3 explains the principle of this embodiment of an object-oriented program automatic generation apparatus which allows automatic generation of an object-oriented programing language program. In this figure, a class definition storage unit 1 stores one or a plurality of class definitions 11 of an object-oriented language program. A parsing unit 2 parses an internal structure of a class definition 11, and generates parsing information 31. A parsing information storage unit 3 stores the parsing information 31 generated by the parsing unit 2.

A generation pattern description storage unit 4 stores a generation pattern description 41 describing a correlationship between a plurality of classes for generating a program pattern. A program generation unit 5 generates a program pattern (a program) specified by a user using the parsing information 31 based on the generation pattern description 41.

A generation verification unit 6 verifies whether or not the definitions of a program generated by the program generation unit 5 conflict with those of an existing class definition 11 utilized in the parsing information 31. A member variable checking unit 61 determines whether or not a member variable generated by the program generation unit 5 conflicts with a member variable utilized in the parsing information 31. A method checking unit 62 determines whether or not a program method generated by the program generation unit 5 conflicts with a method utilized in the parsing information 31. A superclass duplication checking unit 63 determines whether or not a multiple-inherited member in a program generated by the program generation unit 5 conflicts with a member included in the parsing information.

Provided below is the explanation about the operation of this embodiment.

The parsing unit 2 detects a name, type, and information about an added comment, inheritance relationship, etc. for class name, a comment added to the class, each member variable of the class, and detects a name, argument type information, added comment, inheritance relationship etc. for each method, based on the class definition 11 stored in the class definition storage unit 1 as an input, and stores this information in the parsing information storage unit 3 as the parsing information 31.

The program generation unit 5 generates a program (a program pattern) specified by a user by using the parsing information 31 stored in the parsing information storage unit 3 based on the generation pattern description 41 stored in the generation pattern description storage unit 4.

When generating the program, the program generation unit 5 verifies whether or not the definitions of the generated program conflict with those of the existing class definitions represented in the parsing information 31, by calling any of the member variable checking unit 61, the method checking unit 62, and the superclass duplication checking unit 63, in the generation verification unit 6.

The program generation unit 5 generates a program while verifying a program pattern to be generated, and finally outputs a generated program (source program) 7 including no errors.

Since the internal structure of a class included in a program pattern to be generated is examined according to this embodiment, the parsing information included in the class can be used when a program is generated. In addition, a comment description included in the class definition 11 inputted by the generation pattern description 41 can be interpreted as meaningful information from a user, thereby providing a detailed specification of a process for generating a program pattern based on the generation pattern description 41.

Furthermore, the parsing information 31 of the existing class definition 11 is used in the process for generating a program pattern, thereby providing a description that whether or not the definitions of a program pattern to be generated conflict with those of an existing class definition, can be verified by using the parsing information 31 in the existing class definition 11, in the generation pattern description 41.

Furthermore, a program for installing the above described automatic object-oriented program generation method for use in the automatic object-oriented program generation apparatus can be stored in an appropriate storage medium, and distributed to users.

FIG. 4 is a block diagram showing the entire configuration of the automatic object-oriented program generation apparatus.

In this figure, the same reference numerals are assigned to the portions common to those shown in FIG. 3, and the descriptions thereof are omitted.

In FIG. 4, an input/output unit 9 is connected to a computer system 8. A user (a programmer) can give an instruction such as an a class definition 11 or a generation pattern description 41 to the computer system using a keyboard, etc., so that a program is generated, and the result of a process is obtained from the computer system, or the result of a generation of a message or a program based on an output from a display, etc. of the input/output unit, is obtained.

The computer system includes a CPU 81 for performing operations, and a storage unit 82. The CPU 81 reads out a program 83 required for performing a process from the storage unit 82, and executes the program 83 according to the instruction given by the input/output unit 9. Furthermore, the CPU provides the data 1, 3, and 4 stored in the storage unit 82 to the program 83, and generates the generated program 7. The contents of the class definition storage unit 1 are applied to parsing unit 2 and the processed result stored in the parsing information storage unit 3, the contents of the generation pattern description storage unit 4 and the parsing information storage unit 3 are applied to program generation unit 5, and the processed result of the program generation unit 5 is further processed in the generation verification unit 6, and if there is no conflict definition in the processed result, the result is stored in the generated program 7. If the generation verification unit 6 finds some conflict, an alarm signal is generated for the user.

Provided below is the explanation about the case in which the preferred embodiment according to the present invention is implemented by using the object-oriented programming language C++.

Although FIG. 3, etc. has been explained using the general terms of an object-oriented programming language, the following explanation will be provided by using the terms of C++, which uses a unique terminology.

The correspondences between the general terms of an object-oriented programming language and those of C++ are as follows.

(1) General Term: member variable C++:data member
(2) General Term: method C++:member function
(3) General Term: superclass C++:base class
(4) General Term: subclass C++:derived class FIG. 5 shows the specific example of the class definition 11 shown in FIG. 3 according to the embodiment of the present invention, and more specifically, the example in which a description is made in order to obtain the parsing information 31 which is parsed by the parsing unit 2, and can be used in this embodiment.

In FIG. 5, a symbol "//!!" of C++, which is obtained by appending "!!" to "//" indicating that a comment starts from a location at which this symbol appears, and terminates at the end of a line, is introduced as a special symbol indicating a comment.

A normal comment which immediately follows the symbol "//" and terminates at the end of a line, is referenced only for a user (a programmer) to understand his or her program, and does not relate to the executable part of the program. Consequently, this comment is not used when a source program is compiled. However, the description following "//!!" is a target of parsing according to this embodiment, and is recognized by the program generation unit 5. It indicates the meaningful information for the class name corresponding to the description.

For example, the description "//!!has-a" indicates that the data member in which the special comment "has-a" is made is included in an object of the class. It also indicates that the data member is generated or deleted together with the object. A data member which does not include this special comment "has-a" is recognized as being included in another object, and referenced only within that object.

Figure 6:
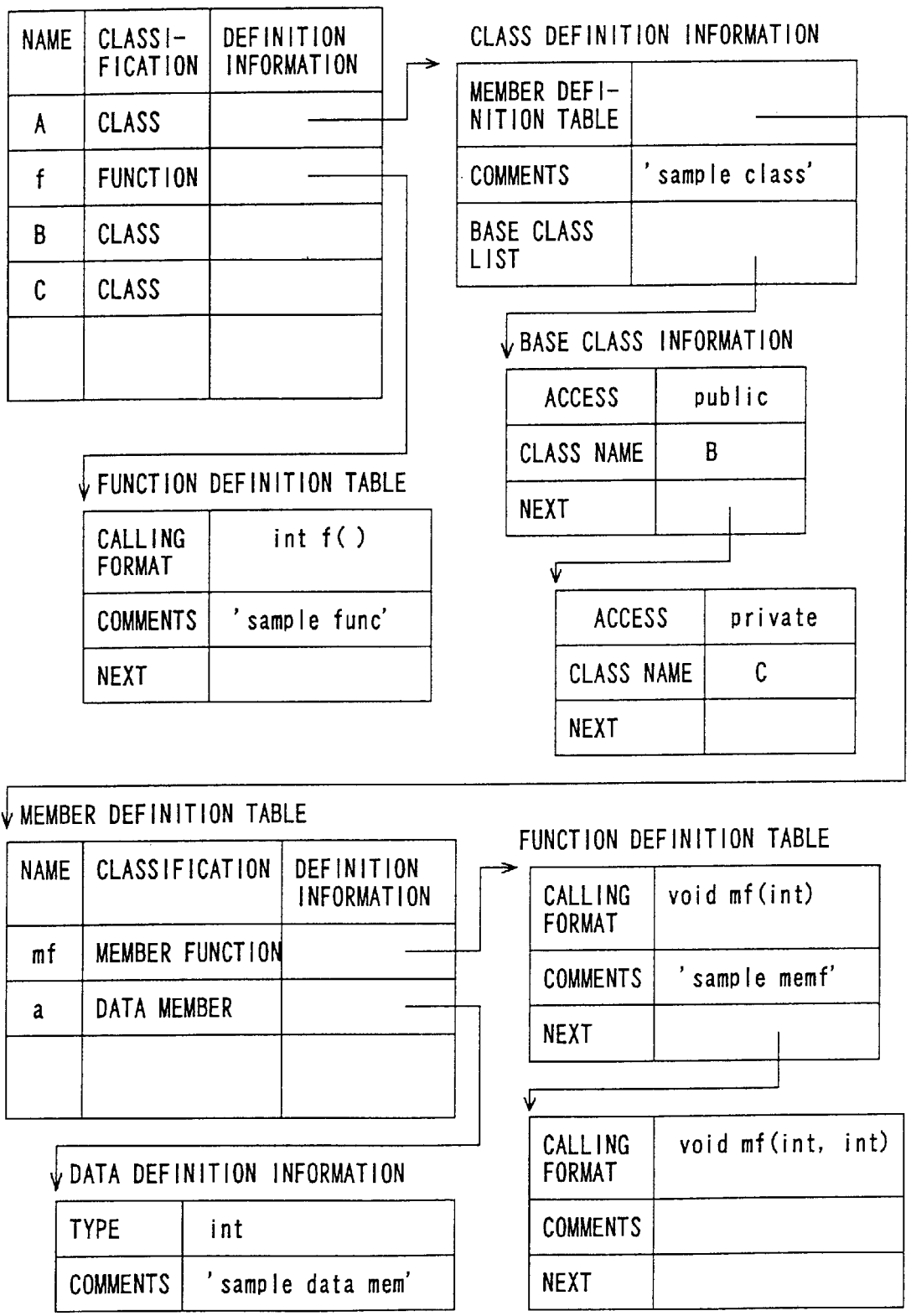
FIG. 6 exemplifies a result of a syntax analysis of the example of the input program.

FIG. 6 shows the result of parsing of the class definition 11 shown in FIG. 5 according to the embodiment, which is performed by the parsing unit 2.

As a result of the parsing of the class definition 11 shown in FIG. 5, which is performed by the parsing unit 2, the parsing information 31 shown in FIG. 6 can be obtained. The parsing information 31 includes information such as a class name in the class definition 11, a variable name including a data member, a function name including a member function name, and a definition of an inheritance relationship between classes, etc.

The parsing is performed, for example, with the method described in "Principles of Compiler Design" A. V. Aho, J. D. Ullman, Addison-Wesley, 1977.

FIGS. 7A, 7B, and 7C exemplify the generation pattern description 41 stored in the generation pattern description storage unit 4 shown in FIG. 3. FIG. 7D exemplifies a class definition 11 which will be an input to the generation pattern description 41, while FIG. 7E exemplifies the output program generated by the general generation rule shown in FIG. 7C when the class definition 11 shown in FIG. 7D is inputted.

Prior to providing the explanation by referring to FIGS. 7A through 7E, the explanation about the description which is newly introduced for the generation pattern description 41 and the simplified structure of the generation pattern description 41 according to this embodiment will be provided.

In and after FIG. 7, a description in which a name in uppercase letters follows the symbol "!!", a description in which a name in lowercase letters follows the symbol "!!", and a description in which a comment follows a symbol "#", are introduced as the descriptions unique to the generation pattern description 41 according to the present invention.

The description in which the name in uppercase letters follows "!!" is a keyword representing the control structure of a program generation rule, and an input/output operation. A line output start statement "!!PRINT_BEGIN", line output end statement "!!PRINT_END", conditional branch statement "!!IF" list element repetition statement "!!FORALL", etc., which are included in the generation rules in the generation pattern description 41, correspond to this keyword, and the meanings of these statements are almost the same as those of a normal programming language C++.

The description in which the name in lowercase letters follows "!!" represents a call of an auxiliary function of a built-in function or a user definition. It is described in the format of a function call statement "!!function_name (argument list)".

The description which immediately follows "#" and terminates at the end of a line is a description of a comment for a user's (programmer's) reference similar to the normal "//" in C++. The comment following "#" also indicates a comment for the generation pattern description 41.

Provided next is the explanation about the structure of the generation pattern description 41 according to the present invention. The generation pattern description 41 is composed of a pattern name, pattern element (pattern variable) list, generation rule output destination definition list, and generation rules. The generation rules included in the generation pattern description 41 are composed of a general generation rule, member function generation rule, data member conversion rule, declaration addition rule, and an auxiliary function definition. In the generation rules, the executable statements such as an assignment statement, line output start statement "!!PRINT_BEGIN", line output end statement "!!PRINT_END", conditional branch statement "!!IF", list element repetition statement "!!FORALL", data member conversion rule call statement "!!rule_name (data_member_name)", function call statement "!! function_name(argument list)" etc. are described.

The pattern name defines a name for making a distinction between a given generation pattern description and another generation pattern description.

The pattern element list is the description for specifying names of the global variables which are defined by a user, and used within the generation pattern description 41, and the description for specifying the input means for the names. The variable here is an alphanumeric character string starting with a character "$". With respect to the input means, there are two specifying methods of "Input", and "File".

A pattern element specified as "Input" is called a "user input pattern element", and its value is specified by a request from the system to a user when the program generation process is executed.

The pattern element specified as "File" is called "file input pattern element", and its value is represented by the name of a program element in the input class definition 11. The program element is specified by a generation instruction comment, which indicates that its program element is made to correspond to its pattern element in the input class definition 11.

The generation rule output destination definition list corresponds to the name of a generation rule, to be described later, with the naming rule of the name of the file for storing a program to be generated in accordance with the generation rule. The naming rule of the file name can use the name of a pattern element used in the generation pattern description 41, the name of a built-in variable obtained from the parsing information 31, and the name of a file which stores the input class definition 11.

The general generation rules among the generation rules are executed without specifying a particular class or a particular member, and is executed only once for an entire input. An output destination file must be defined in the generation rule output destination definition list.

The member function generation rules among the generation rules are executed for each of input class definitions 11, and can generate the definitions of member functions required for the class which is defined by the class definition 11, thereby directly accessing the information about the structure of a class to be processed in the parsing information 31. An output destination file must be defined in the generation rule output destination definition list.

The declaration addition rules among the generation rules are executed for each input class definition 11, and declarations necessary for the class (a data member declaration, member function declaration, and a base class declaration) can be added, thereby directly accessing the information about the structure of a class to be processed in the parsing information 31. An output destination file is required to be defined in the generation rule output destination file definition list.

The data member conversion rules among the generation rules are a rule called by the above described three types of rules (the general generation rules, member function generation rules and declaration addition rules), and is used for describing a method for generating a process required for each data member. A variety of information about data members to be processed in the parsing information 31 can be directly accessed in this rule. An output destination file definition is not made according to the generation rule output destination definition list.

The auxiliary function definition among the generation rules defines a subroutine called by the above described four types of rules (i.e. the general generation rules, member function generation rules, declaration addition rules and the data member conversion rules), or another auxiliary function definition. An output destination file definition is not made according to the generation rule output destination definition list.

As described above, the member function generation rules and declaration addition rules are executed after the class to be processed is specified beforehand. The data member conversion rules and auxiliary function definition are called while these rules are being executed.

The descriptions shown in FIGS. 7A, 7B and 7C are made by on the premise of the above described definitions. They are generation pattern descriptions 41 for generating a program with which a class derived from a task management class (TaskMan) is arranged outside the existing application class, and the derived class is made responsible for a process of an external communication.

FIG. 7A shows the example of a description representing a pattern name, a pattern element list, and a generation rule output destination definition list in the generation pattern description 41. FIGS. 7B and 7C show the examples of descriptions representing the general generation rules. FIG. 7D shows the example of the class definition 11 to be inputted for generating the above described program pattern. FIG. 7E shows the program outputted by executing the general generation rule shown in FIG. 7C.

In FIG. 7A, since a first pattern element "$taskname" has the specification of "Input", it is a user input pattern element. Since the second pattern element "$app_class" has the specification of "File", it is a file input pattern element.

In the class definition 11 shown in FIG. 7D, a class name to be set in "$app_class" has been specified by a generation instruction comment "//!!Pattern(TaskPattern, $app_class)", which indicates that a class name "Appl" on that line is set for a pattern element "$app_class" of a program which has a generation pattern name "Taskpattern".

In the example shown in FIG. 7E derived from FIG. 7A, a name "T" is inputted from a user (programmer) for a user input pattern element "$taskname". When the program generation unit 5 executes the general generation rules shown in FIG. 7C, the output is as shown in FIG. 7E, and the respective pattern elements ($taskname, $app_class) in the general generation rules shown in FIG. 7C are replaced with the given character string ("T", "Appl"). As a result, a program for defining a derived class (T_man) of the above described task management class (TaskMan) is generated.

FIGS. 8A through 8E show the examples of executable statements described in the generation rule in the generation pattern description 41, and their execution results.

FIG. 8A exemplifies an assignment statement which is one of executable statements described in the generation rule. The assignment statement indicates that an assignment process is performed from the right side of an equal sign to the left side, in the same manner as in a normal programming language.

FIG. 8B exemplifies a line output start statement "!!PRINT_BEGIN", and a line output end statement "!!PRINT_END", each of which is an executable statement described in the generation rule.

The line output start statement "!!PRINT_BEGIN", is an executable statement for outputting the result of a generation. It repeats the following process until the line output end statement "!!PRINT-END" appears:

(1) reading out the next line in the generation rule;
(2) searching for a variable (starting with the symbol "S") of the generation rule, which appears in that line, and replacing the searched variable with a character string having a current value; and
(3) outputting that line after completing the replacement of all variables.

FIG. 8C exemplifies the resultant output obtained by executing the line output start statement "!!PRINT_BEGIN", and the line output end statement "!!PRINT_END".

FIG. 8D exemplifies a conditional branch statement "!!IF", which is one of the executable statements described in the generation rule.

The conditional branch statement indicates that a conditional branch process is performed in the same manner as in a normal programming language. In this example, if a variable "$x" of the generation rule is "100", a line of an executable statement for assigning "10" to a variable corresponding to "$y", is output. If the variable "$x" in the generation rule is not "100", a line of an executable statement for assigning "1" to the variable corresponding to "$y", is output.

FIG. 8E exemplifies a list element repeat statement "!!FORALL", which is one of the executable statements described in the generation rule.

The list element repeat statement "!!FORALL" sequentially extracts elements from the beginning of a list specified after "!!IN", assigns each of the elements to a variable "$elm" specified by the first element, executes the process enclosed by brackets { }, and repeats it until reaching the end of the list.

Although not shown in FIGS. 8A to 8E, a data member conversion rule call statement "!!rule_name (data_member_name)", which is one of the executable statements described in the generation rule, uses a data member name as an argument, sets its definition information in a global variable, and executes the definition of the rule. Since the data member conversion rule call statement gives a member name, for example, as an argument, a description such as "!!data_mem_rule ($mem)" is made.

Although not shown in FIGS. 8A to 8E, and similar to the above description, a function call statement "!!function_name (argument list)", which is one of the executable statements described in the generation rule, calls a user definition auxiliary function or a built-in function as a subroutine, as explained in the above description of the name in lowercase letters which follows the symbol "!!". The example of this function call statement is almost the same as that of the above described data member conversion rule call statement in terms of format. Since the function call statement, however, can include an arbitrary number of arguments, it is described such as "!!fund1($xxx,$yyy).".

Here, for the process for a built-in or intrinsic function called by the function call statement within the generation rule according to this embodiment, several new built-in functions must be made executable in order to utilize the parsing information 31. These built-in functions are explained below.

A built-in function "type_string (member_name) " is a function for extracting the definition of the member name, which is the current process target from the parsing information 31, converting the type information into a character string, and returning it.

A built-in function "comment_check (name, character_string_of_a_comment)" is a function for searching the parsing information 31 for the definition of a name specified by the first argument, and examining whether or not the character string of the second argument is included in the comment. The search at this time targets a global name table for the general generation rules, or a class which is the current process target and its member definitions for the member function generation rules and the declaration addition rules.

A built-in function "member_vars (class_name)" is a function for extracting all data members in a specified class from the parsing information 31, making a list of the members, and returning the list.

A built-in function "base_classes (class_name)" is a function for extracting all base_classes in a specified class from the parsing information 31, making a list of the members, and returning the list.

A built-in function "add_base_list (base_class_name)" is a function for adding an argument class as a public base class to the class name which is the current process target.

A built-in function "replace_header (character_string)" is a function for replacing a header (a class name and a base class declaration part) of a class declaration with a character string specified by an argument. If a variable reference is included in the character string, that part is replaced with the value of that variable in advance.

A built-in function "error (character_string)" is a function for outputting an error message to abort the program generation process.

A built-in function "warning (character_string)" is a function for issuing a warning message. The program generation process, however, is continued despite the issuance of this message.

A built-in function "comment_params (name, character_string_of_a_comment)" is a function for searching the parsing information 31 for the definition of a name specified by the first argument, examining whether or not the character string of the second argument is included in the comment, recognizing the character string described in parentheses ( ) of a comment as being a "generation instruction parameter", if a generation instruction comment is described in a format xxx(yyy) such as a function call format for a name given by an argument (class name, member name, etc.), and extracting the character string.

A built-in function "mem_funcs (class_name)" is a function for searching the parsing information 31, making a list of all member functions in a given class, and returning the list.

A built-in function "base_check" (class_name) is a function for searching the parsing information 31, and determining whether or not a base class is included in a given class.

A built-in function "all_classes( )" is a function for searching the parsing information 31, making a list of all inputted classes, and returning the list.

Additionally, several new built-in functions must be made executable in order to call each of the units 61, 62, and 63 in the generation verification unit 6. These built-in functions will be explained below.

A built-in function "check_member" is a function for calling the member variable checking unit 61 which determines whether or not data members are duplicated.

A built-in function "check_method" is a function for calling the method checking unit 62 which determines whether or not member functions are duplicated.

A built-in function "check_duplicate" is a function for calling the superclass duplication checking unit 63 which determines whether or not member names are duplicated due to single inheritance or multiple inheritance.

According to this embodiment, a program can be automatically generated using the above described new definitions. The operations for automatically generating a program will be explained below.

The outline of the operations according to this embodiment is described above by referring to the principle of this embodiment shown in FIG. 3. This embodiment, however, relates to the invention for automatically generating a program, and it is important and the main technical concept of this embodiment how the program generation unit 5 generates a program using the parsing information 31 and the generation pattern description 41 based on the general generation rules, member function generation rules, and the declaration addition rules by executing the generation rules. Particularly, the process for executing the generation rules which generate a program pattern based on the general generation rules, member function generation rules, and the declaration addition rules, among the operations of the program generation unit 5, is important. Furthermore, the data member conversion rules and the auxiliary function definition used in the above described generation rule process are also important. The detailed explanation about the main operations of the above described embodiment will be provided below.

Figure 9:
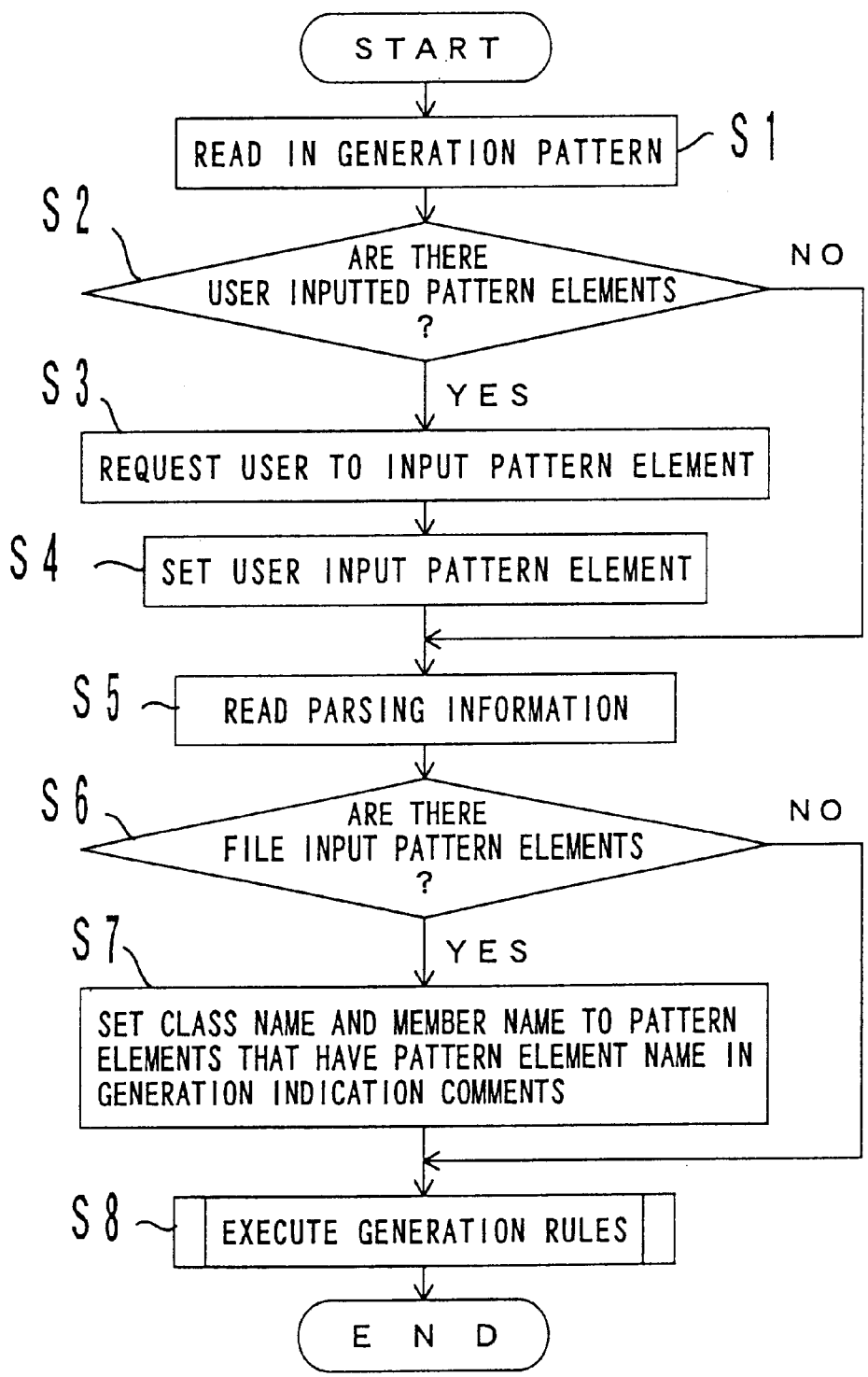
FIG. 9 is a flowchart showing an outline of a process performed by the program generating unit.

Provided first is the explanation about the operations when the program generation unit 5 generates a program, by referring to the flowchart shown in FIG. 9.

FIG. 9 is the flowchart explaining the entire operations of the program generation unit 5. Steps S1 through S7 indicate how to set a pattern element used when the generation rule is executed, prior to executing the generation rule. The program generation unit 5 reads, for example, the generation pattern descriptions shown in FIGS. 7A, 7B and 7C, and the parsing information 31 (not shown in this figure) of the class definition 11 shown in FIG. 7D, determines whether or not there is a user input pattern element or a file input pattern element, and sets a pattern element according to the result of the determination. If there is a user input pattern element in the pattern element list in the generation pattern description

41, a user is prompted to input the pattern element, and the pattern element is set. If a file input pattern element exists in the parsing information 31, the contents of the comment such as a class name and/or a member name in the parsing information 31, is identified, and a class name and/or a member name having the corresponding pattern element name as a comment(generation instruction comment) is set as the pattern element.

In step S1, the program generation unit 5 sequentially reads the contents of the generation pattern description 41 which is stored in the generation pattern description storage unit 4, and possesses a specified pattern name generation pattern description 41, from the beginning.

In step S2, the pattern element list in the generation pattern description 41 is examined, and it is determined whether or not a user input pattern element exists in the list. In the case shown in FIG. 7A, if the user input pattern element exists, steps S3 and S4 are performed. If no user input pattern element exists, the process goes to step S5.

In step S3, a user is prompted to input the value to be set in the user input pattern element.

In step S4, the value inputted in step S3 is set in the user input pattern element.

In step S5, the parsing information 31 stored in the parsing information storage unit 3 is read out.

In step S6, it is determined whether or not a file input pattern element exists. If a file input pattern element exists, step S7 is performed. If no file input pattern element exists, the process goes to step S8.

In step S7, all entries in the parsing information 31 are examined, a class name and/or a member name having the corresponding file input pattern element name as the generation instruction comment "//!!Pattern (generation pattern name, pattern element name)", and the detected name are set in the pattern element.

In step S8, a generation rule execution process, which will be described later, is performed, and the process is terminated.

The above described process performed in steps S1 through S7 allows a pattern element for executing the generation rule according to this embodiment to be set, thereby executing the generation rule in step S8.

Figure 10:
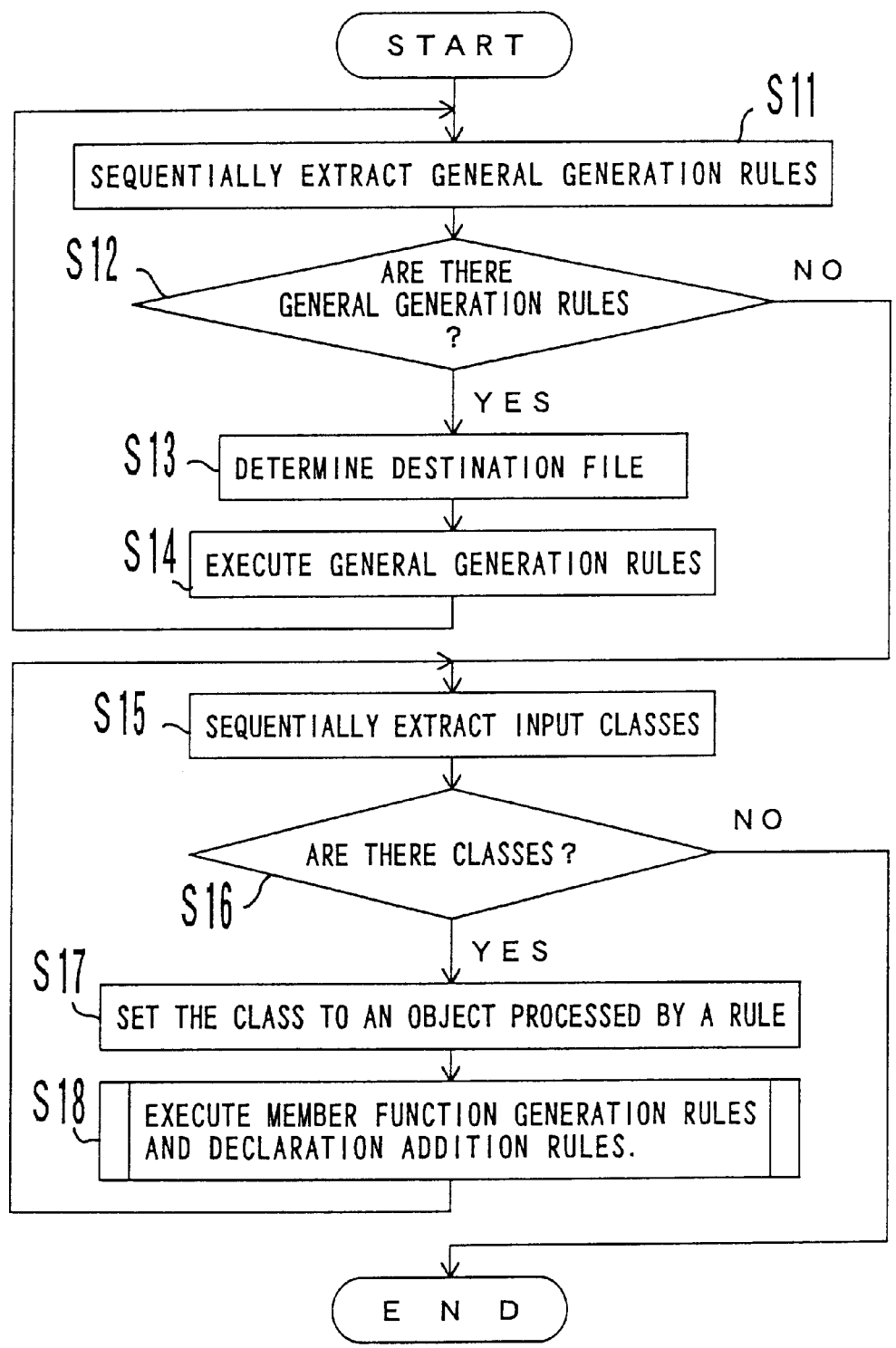
FIG. 10 is a flowchart showing a process for executing generation rules.

FIG. 10 is a flowchart showing the generation rule execution process performed in step S8 of the flowchart of the operations performed by the program generation unit 5 shown in FIG. 9.

For the generation rule according to this embodiment, the general generation rule, member function generation rule, and the declaration addition rule, are executed in this order. In FIG. 10, a class to be processed must be set prior to the execution of the member function generation rule and the declaration addition rule among the generation rule.

In step S1, general generation rules are sequentially extracted from the generation pattern description 41.

In step S12, it is determined whether or not the general generation rule exists. If "YES", the process goes to step S13. If "NO", the process skips to step S15.

In step S13, an output destination file of the program to be generated is determined by referencing the generation rule output destination definition list in the generation pattern description 41.

In step S14, each of the extracted general generation rules is executed, each pattern element in the general generation rules is replaced with a given character string, and the program is generated. The generated program is then output to the output destination file determined in step S13, and the process goes back to step S11.

In step S15, input classes are sequentially extracted from the parsing information 31.

In step S16, it is determined whether or not a class yet to be processed is left. If "YES", the process goes to steps S17 and S18. If "NO", the process is terminated.

In step S17, the class is set as the process target of the member function generation rule and the declaration addition rule.

In step S18, the member function generation rule and the declaration addition rule are executed. Then, the process goes back to step S15 to repeat the operations in a similar manner.

Figure 11:
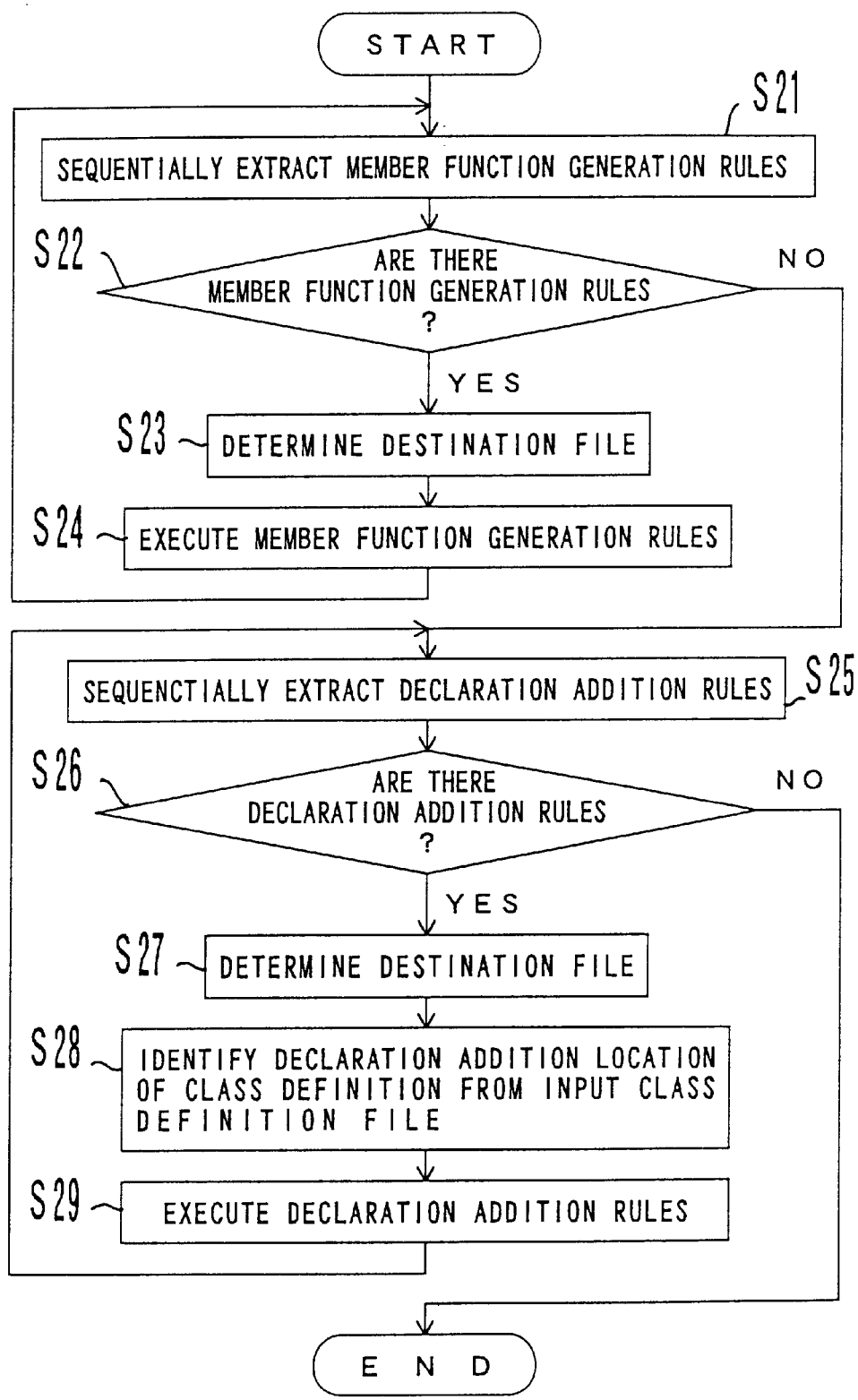
FIG. 11 is a flowchart showing a process for executing a member function generation rule and a declaration addition rule.

The operations of FIG. 10, which are shown as the flowchart of the generation rule execution process performed in step S8 in the flowchart of the operations performed by the program generation unit 5 shown in FIG. 9, are as described above. Provided next is the further explanation about the above described process for executing the member function generation rule and the declaration addition rule, which is performed in step S18 of FIG. 10, by referring to FIG. 11.

In step S21, the member function generation rules yet to be executed corresponding to the class specified as the process target, are sequentially extracted.

In step S22, it is determined whether or not a member function generation rule yet to be executed is left. If "YES", the process goes to steps S23 and S24. If "NO", the process skips to step S25.

In step S23, an output destination file of the program to be generated is determined by referencing the generation rule output destination definition list in the generation pattern description 41, according to the execution of the member function generation rules extracted in step S21.

In step S24, the extracted member function generation rules are executed for the class specified as the process target, so that the program is generated and stored in the output destination file determined in step S23. Then, the process goes back to step S21.

In step S25, declaration addition rules yet to be executed are sequentially extracted.

In step S26, it is determined whether or not a declaration addition rule yet to be executed is left. If "YES", the process goes to steps S27, S28, and S29. If "NO", the process is terminated.

In step S27, an output destination file of the program to be generated is determined by referencing the generation rule output destination definition list in the generation pattern description 41, according to the execution of the declaration addition rules extracted in step S25.

In step S28, the declaration addition location in the class definition of the class specified as the process target is identified according to the file (input class definition file) including the class definition information in the parsing information.

In step S29, the extracted declaration addition rules are executed for the class specified as the process target, so that a new program is generated and stored in the output destination file set in step S27. Then, the process goes back to step S25.

Figure 2C:
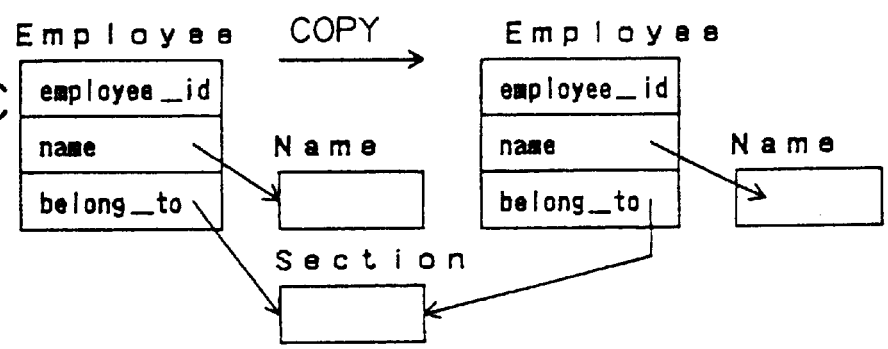
FIG. 2C shows the objective structure of the class definition shown in FIG. 1 which is processed by a copy constructor function.

Provided below is the specific explanation about the above described process for executing the member function generation rule and the declaration addition rule, by using the definitions added according to this embodiment, in addition to the definitions of the object-oriented programming language C++. As a specific example, the example in which the copy constructor function having the copy capability shown in FIG. 2C, which has to be defined by a user according to the prior art, is automatically generated according to the present invention, is explained by referring to the drawings.

Provided first is the example of the portion of the generation pattern description 41 in which the copy constructor is defined.

FIGS. 12A and 12B exemplify the data member conversion rule in the generation pattern description 41, which defines the copy constructor.

With the data member conversion rule named a "copy_initialization_specifier_generation" rule, which is shown in FIG. 12A, the information about the type of the data member whose member name is given as an argument, is obtained from the parsing information 31 by using the "type_string" function; and the declaration of the initialization specifier for a copy operation when the obtained type of the data member is "user_defined".

With the data member conversion rule shown in FIG. 12B, the information about the type of the data member whose member name is given as the argument is obtained from the parsing information 31 by using the "type_string" function in a similar manner as in FIG. 12A; whether the obtained type of the data member is either an integer type or a character string type is determined by using the "mem_type" function; and whether or not specification of "has-a" is added as a comment is determined by using the "comment_check" function, if the obtained type is the character string type. If "YES", "$mem" is replaced. If "NO", the process is branched in order to output the character string unchanged, thereby generating a copy format.

FIG. 13 exemplifies the declaration addition rule for generating a declaration of the copy constructor. As a result of executing the declaration addition rule shown in FIG. 13, the class name is referenced and the declaration of the copy constructor is added to the existing class definition 11.

FIG. 14 exemplifies the member function generation rule for generating the definition of the copy constructor function. With the member function generation rule shown in FIG. 14, the data member conversion rule shown in FIGS. 12A and 12B is called and applied to all data members in the existing class, thereby automatically generating (adding) the definition of the copy constructor for the existing class definition 11.

As described above, an executable statement in the generation pattern description 41 allows the name and type information of a data member in a class obtained from the parsing information 31 in the class definition 11, and the information about a comment added to a member in a program, etc., to be used, thereby generating a program pattern under a condition depending on the above described information.

The operations for automatically generating an object-oriented programming language program according to this embodiment are as described above. According to this embodiment, the generation verification unit 6 checks whether or not the definition of a program to be generated conflicts with that of an existing program, so that an unsuitable program is not generated. This capability is explained below by referring to the drawings.

Figure 15:
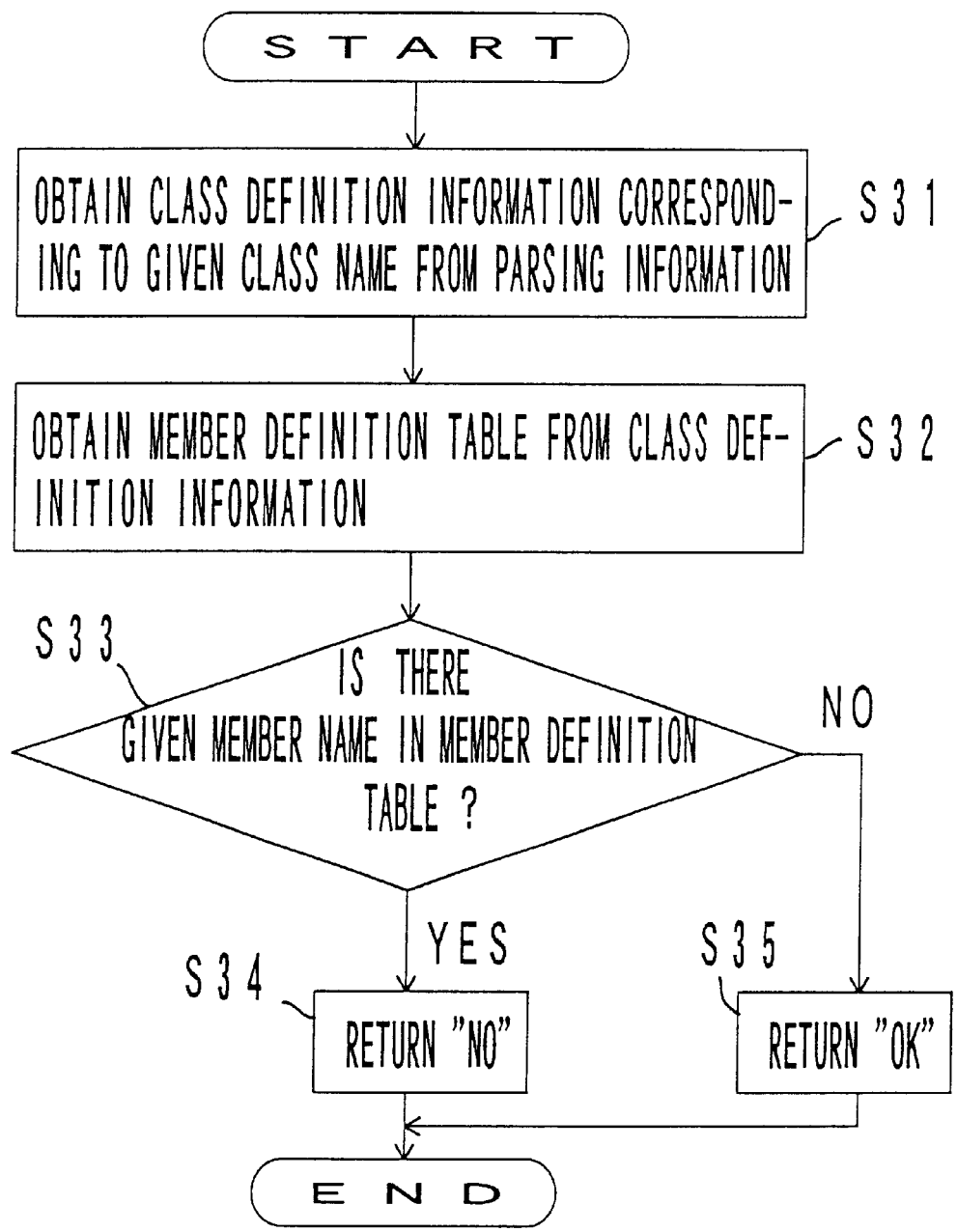
FIG. 15 is a flowchart showing a process performed by a member variable checking unit.

FIG. 15 is a flowchart showing a process performed by the member variable checking unit 61 in the generation verification unit 6.

In step S31, class definition information corresponding to a class name given as an argument is obtained from the parsing information 31.

In step S32, a member definition table is obtained form the obtained class definition information.

In step S33, it is determined whether or not the member definition table includes the member name given as the argument. If "YES", the process in step S34 is performed. If "NO", the process in step S35 is performed.

In step S34, "NO" is returned to the program generation unit 5, and the process is terminated.

In step S35, "OK" is returned to the program generation unit 5, and the process is terminated.

As described above, it is verified by referencing the class definition table and the member definition table in the parsing information 31 whether or not the data member with the given name was previously declared in the class with the given name.

FIG. 16 is a flowchart explaining the process performed by the method checking unit 62 in the generation verification unit 6.

In step S41, the class definition information corresponding to a class name given as an argument is obtained from the parsing information 31.

In step S42, the member definition table is obtained from the obtained class definition information.

In step S43, it is determined whether or not the member definition table includes the given member function name as an argument. If "YES", the process goes to step S44. If "NO", the process skips to step S48.

In step S44, the function definition table corresponding to the member function name is extracted from the member definition table.

In step S45, elements are sequentially extracted in the order of elements in the function definition table.

In step S46, it is determined whether or not calling format coincides with calling format for the extracted elements. If "YES", step S49 is performed. If "NO", step S47 is performed.

In step S47, it is determined whether or not the function definition table includes a next element. If "YES", steps S45 and S46 are performed to repeat the checking. If "NO", step S48 is performed.

In step S48, "OK" is returned to the program generation unit 5, and the process is terminated.

In step S49, "NO" is returned to the program generation unit 5, and the process is terminated.

As described above, it can be verified by referencing the class definition information, member definition table, and the function definition table in the parsing information, whether or not a member function whose name is given was previously declared in a class whose name is given.

Figure 17:
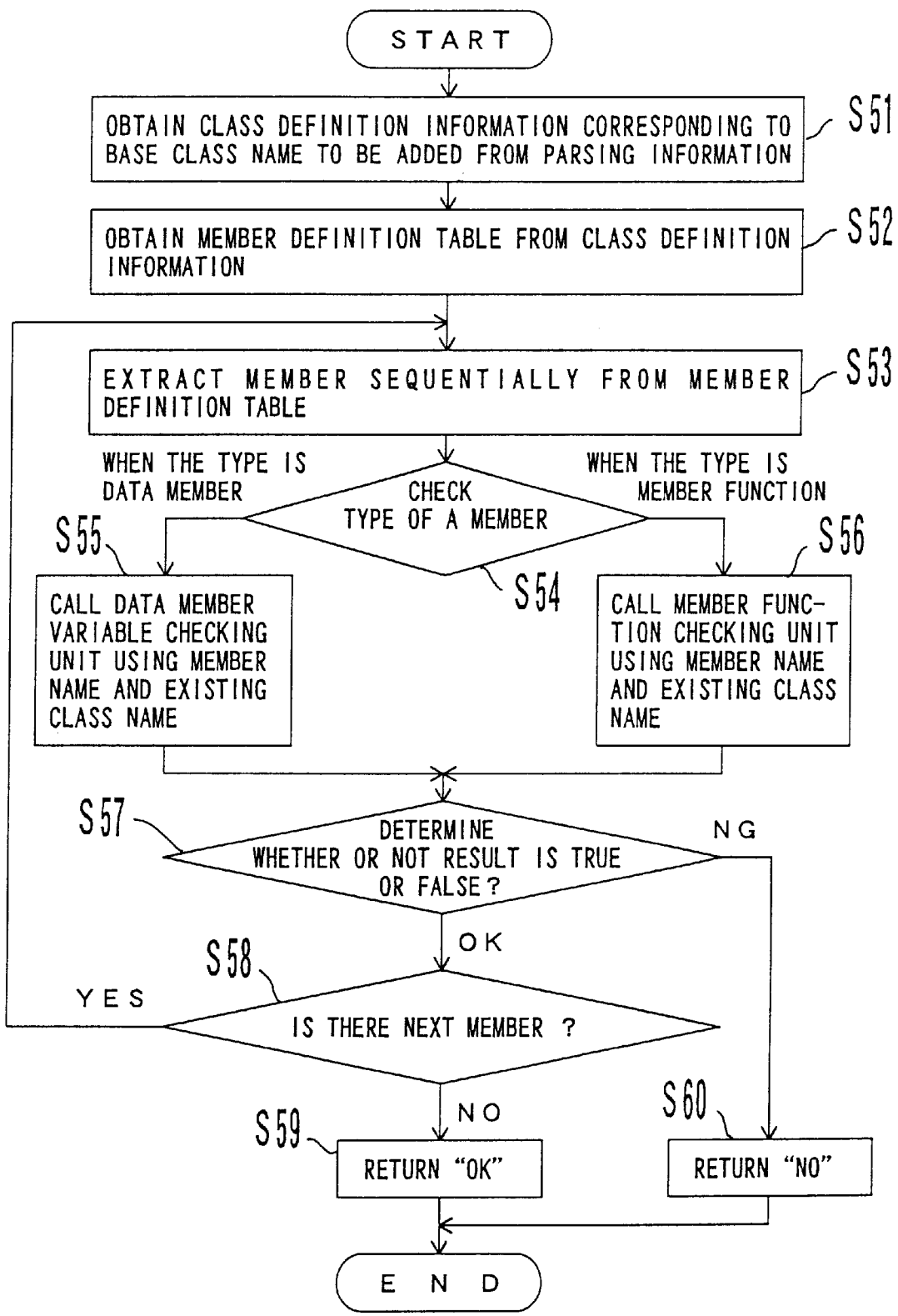
FIG. 17 is a flowchart showing a process performed by a superclass duplication checking unit.

FIG. 17 is a flowchart showing a process performed by the superclass duplication checking unit 63 included in the generation verification unit 6.

In step S51, class definition information corresponding to a base class name to be added is obtained from the parsing information 31.

In step S52, a member definition table is obtained from the obtained class definition information.

In step S53, the members are sequentially extracted from the member definition table.

In step S54, the type of each of the extracted members is examined based on the class definition information obtained in step S53. If a member is a data member, the process in step S55 is performed. If the member is a member function, the process in step S56 is performed.

In step S55, the member variable checking unit 61 is called by using a member name and existing class name as arguments, and it is determined whether the result of the call of this step is either true or false in step S57.

In step S56, the method checking unit 62 is called by using a member class and existing class name as arguments, and it is determined whether the result of the call is either true or false in step S57.

In step S57, if the result of the determination is true (OK), the process of step S58 is performed. If the result of the determination is false (NO), the process of step S60 is performed.

In step S58, it is determined whether or not a next member exists in the member definition table. If a next member exists, the process goes back to step S53. If no next member exists, the process goes to step S59.

In step S59, "OK" is returned to the program generation unit 5, and the process is terminated.

In step S60, "NO" is returned to the program generation unit 5, and the process is terminated. As described above, it is verified whether or not a conflict between members occurs, when a base class is added to an existing class by referencing the information of the class definition of the parsing information 31, and the member definition table, and calling the above described member variable checking unit 61 and method checking unit 62.

Provided below is the explanation about the operations performed by the member variable checking unit 61, method checking unit 62, and the superclass duplication checking unit 63, and the operations for generating a program by distinguishing a program pattern depending on a condition according to the result of a checking made by these units, by referring to the drawings.

FIG. 18 exemplifies a declaration addition rule using a "check_member" function corresponding to the member variable checking unit 61.

When a program pattern is generated, generation of an unsuitable program can be prevented by calling the built-in function "check_member", which determines whether or not a data member to be added to a class declaration conflicts with an existing class definition, in the declaration addition rule in the generation pattern description 41. The "check_member" function calls the member variable checking unit 61 in the generation verification unit 6 to verify that the data member to be added does not conflict with the existing data member in the given class by using the parsing information 31.

As described above, it can be determined whether or not there is a conflict between an added name of a new rule and an existing name. If there is no conflict, a program pattern is generated. If there is a conflict, an error is returned.

FIG. 19 exemplifies the description of the class definition 11, when a program pattern to be generated varies depending on information of a member function (method). When parameters are particular values, a comment is added to each of the member functions in the input class definition 11, and a function for defining in which case each of the functions is called is generated, in FIG. 19. The added comment is used to extract information from the member function generation rule in FIG. 20, which is the description of the member function generation rule in the example shown in FIG. 19.

In FIG. 20, the values in the comment added to each of the functions shown in FIG. 19, which correspond to the parameters in the input class definition, are extracted, and the member functions which describe those values and are shown in FIG. 19, are called to indicate the rule for automatically generating the member functions.

Since the explanation of the declaration addition rule is similar to that of the member function generation rule, it is omitted here.

With the member function generation rule shown in FIG. 20, the function specified in the class definition 11 shown in FIG. 19 is recognized by the "comment_check" function, and the arguments specified by the comments described in the class definition 11 shown in FIG. 19 are used by the "comment_params" function, so that a program pattern can be generated depending on a case.

In this way, the name of a member function of a class, type information, information of a comment added to the member function in a program, etc., which are obtained from the parsing information 31 which parses the structure of the class definition 11, can be used in the generation pattern description 41, thereby generating a program pattern depending on a condition, based on the information.

Provided next is the explanation about the operations performed by the method checking unit 62.

In an object-oriented programming language, a multiple definition of methods is normally permitted. Even if method names are the same, they are handled as different methods when the numbers of arguments and their types are different. Accordingly, a duplication checking must be made in addition to the checkings of number of arguments and argument types, in order to properly avoid duplication.

FIG. 21 exemplifies a declaration addition rule of the copy constructor function which makes the above described duplication checking. The example shown in FIG. 21 is the description to which the duplication checking of a member function is added in order to prevent a duplicated definition from being generated by the copy constructor, which was referred to in the example shown in FIG. 13.

Here, the explanation is provided by referring to only the example of the declaration addition rule. The explanation about the member function generation rule, however, is omitted because it is similar to that of the declaration addition rule.

In FIG. 21, the "check_method" function calls the method checking unit 62 included in the generation verification unit 6.

The method checking unit 62 first references the parsing information 31, and parses the structure of the member function declaration (declaration made by the copy constructor), which is specified by the character string "$class(const$class&)". Next, the method checking unit 62 performs a process for determining whether or not there is a conflict between the member functions by making a comparison between the result of the parsing and the corresponding member function definition information in the class.

With this process, it can be controlled by the generation pattern description 41 that generation of a program pattern which conflicts with an existing definition is prevented.

Provided next is the explanation about the operations performed by the superclass duplication checking unit 63, and the case in which a program pattern is generated depending on a condition, based on the operations.

The rule for generating an output function for outputting the entire contents of data members in a class including its base class (superclass) can be processed under a condition which depends on the existence/non-existence of the base class.

FIG. 22 exemplifies the member function generation rule for generating the above described output function. This rule determines whether or not there are base classes of the classes given by the built-in function "base_check". If "YES", all of the base classes are extracted, and the process for calling a print function for the base classes is generated. Then, a program is generated so that the base members are output.

In this way, the information about base classes (super classes) obtained from the parsing information 31 in the class definition 11 can be used, and a program can be generated under a condition depending on the information.

The case will now be considered in which a generation pattern description which passes a certain base class (super class) to an existing class, and provides the existing class with the new capability, is defined.

In this case, there is a possibility that the members in the passed class overwrite the members in the existing class. Therefore, the rule of the generation pattern description 41 must be defined so that a warning is issued when the program pattern is generated.

FIG. 23 exemplifies the declaration addition rule in the case of such a base class definition. The built-in function "check_duplicate" checks whether or not a member and its base class in an existing base class is duplicated with a member in a passed class, and issues a warning if duplication is found. The built-in function "replace_header" is used to indicate that the header of the class definition is replaced.

With the declaration addition rule, it can be controlled by the generation pattern description 41 that a warning is issued by using the information about inheritance of the parsing information 31, when an existing inherited definition is overridden.

Next, the case will be considered in which the generation pattern description 41 that passes a base class (superclass) of an existing class, and provides the existing class with a new capability, is defined. If the target existing class has previously inherited another base class at this time, a conflict between the name of a member in that base class and that of the class to be newly inherited may occur. In such a case, a compilation error will occur when the duplicate member is referenced in the generated class. Therefore, a rule can be described beforehand so that such a conflict can be prevented at the time of generation, according to this embodiment.

FIG. 24 exemplifies a declaration addition rule in the above described case of a base class addition. With this rule, it can be controlled by the generation pattern description 41 that generation of a program pattern which conflicts with the relationship of an existing multiple inheritance can be prevented by using the information about inheritance in the parsing information 31.

It is determined whether or not base classes exist for generated classes by using the built-in function "base_check". If the base classes exist, all of them are extracted. Then, it is determined whether or not the definitions of the existing base classes conflict with that of the newly added base class by using the built-in function "check_duplicate". If a conflict is found, an error is notified to the user and no addition of a new base class is made.

Furthermore, the case in which a sequence of operations is performed for a complex structure composed of element classes which possess predetermined attributes will be considered. If those operations are included in each of the element classes, the entire process will become complicated. That is, if an operation is defined for each of the element classes each time a similar operation is required, the entire process will become complicated.

For example, when data having a complicated structure such as graphics data, is output to a printer, a different process is performed depending on the capability of the printer to which the data is output. Assigning processes to the graphics data side must be prevented from a viewpoint of flexibly adding a capability.

To flexibly perform such processes, the generation pattern called a "Visitor pattern" is known. This pattern is referred to in "Design Patterns", E.Gamma et al., Addison Wesley, 1995. The explanation about the case in which the "Visitor pattern" is used is provided below. First of all, the explanation about the "Visitor pattern" is provided.

With the "Visitor pattern", element classes to be processed inherit the base class "Element". The class representing the process performed for the "Element" is defined as a "Processor". A virtual member function "accept" which receives a pointer to the "Processor" is declared on the "Element" side. The definition of this function is made for each of specific element classes. This function only passes its own pointer to a function for defining a process for each of the element classes, which is prepared on the "Processor" side.

The "Visitor pattern" is composed of, for example, the class definition on the "Element" side class, and the class definition on the "Processor" side class.

FIG. 25 exemplifies the class definition on the "Element" side. In this figure, "E1", . . . , "Em" indicate the specific element classes, and the classes "Element", "E1", . . . , "Em" are stored in respective files.

FIG. 26 exemplifies the class definition on the "Processor" side which performs a process. In this figure, the process of each of the specific element classes "P1", . . . , "Pn" is declared as the virtual member function of the base class "Processor". Each process is implemented with each of the process classes "P1", . . . , "Pn". The classes "Processor", "P1", . . . , "Pn" are stored in respective files.

FIGS. 27, 28A, 28B, 28C, and 31 through 35, which will be explained next, indicate the generation pattern description 41 for generating the "Visitor pattern" composed of the definitions shown in FIGS. 25 and 26. The class definition shown in FIG. 25 is generated from the general generation rule shown in FIG. 28A, and the declaration addition rules shown in FIGS. 28B, 31 and 32. The class definition shown in FIG. 26 is generated from the general generation rule shown in FIG. 33, and the declaration addition rules shown in FIGS. 28C, 34 and 35. The generation of these definitions is performed by inputting the class definition shown in FIG. 29, to be described later.

FIG. 27 exemplifies the pattern name and generation rule output destination definition list of the "Visitor pattern".

Here, "$infile" is a built-in variable holding the name of an input class definition file.

FIG. 28A exemplifies the general generation rule of the generation pattern description of the class definition of the "Visitor pattern" on the "Element" side, which is shown in FIG. 25.

FIG. 28B exemplifies the declaration addition rule of the general pattern description of the "Visitor pattern" on the "Element" side.

FIG. 28C exemplifies the declaration addition rule of the general pattern description on the "Processor" side. Note that FIG. 33 exemplifies the general generation rule on the "Processor" side.

FIG. 29 exemplifies the input class definition 11 for making the class definition shown in FIGS. 25 and 26. Assume that a class to which an input is supplied is a group of element classes which will become a derived class of the "Element", and a class which will become a derived class of the "Processor". Their roles are specified by the comments in the generation pattern descriptions 41, as shown in FIG. 29.

Figure 30:
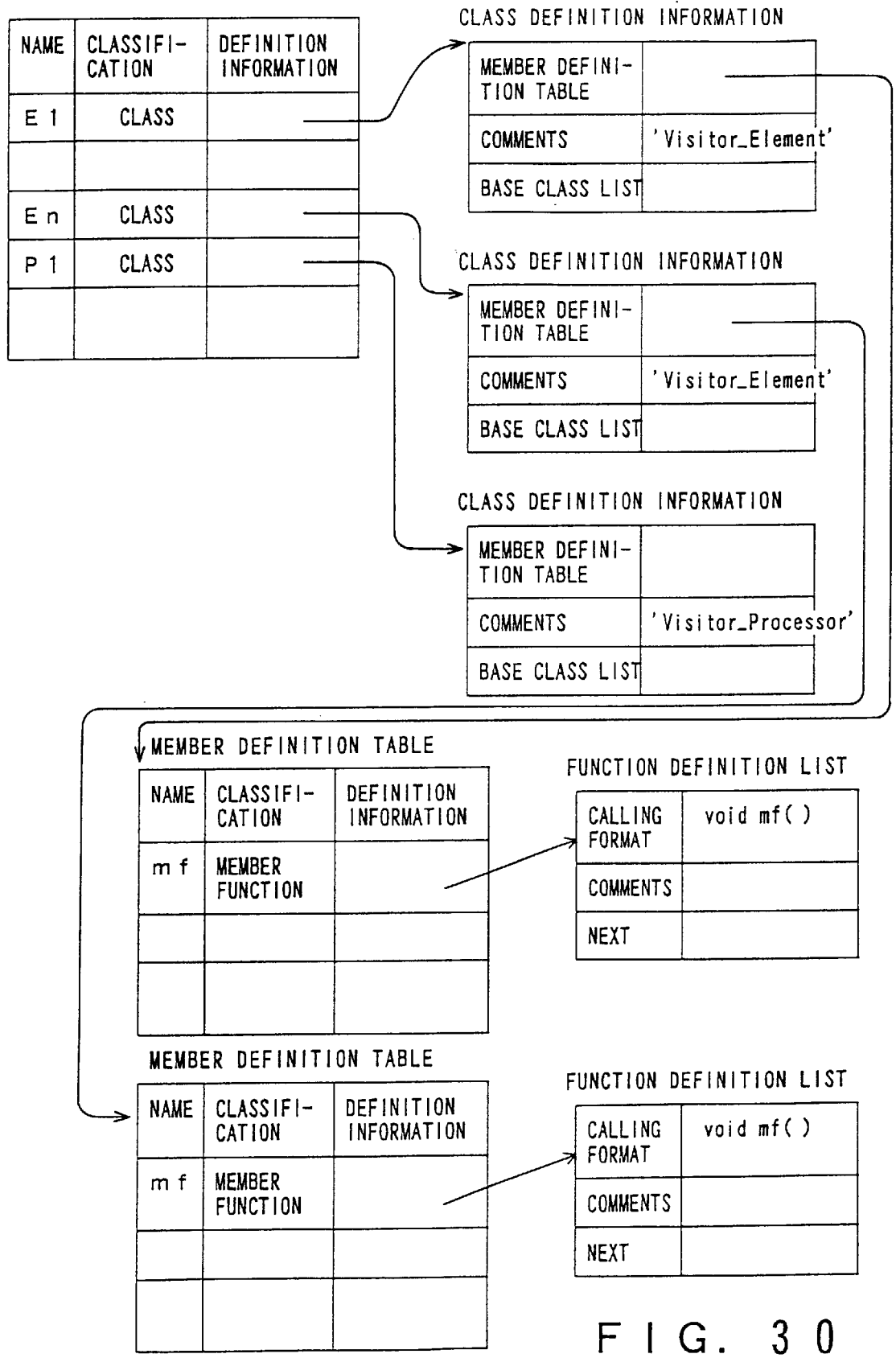
FIG. 30 exemplifies a result of a syntax analysis of the example shown in FIG. 29.

FIG. 30 is a schematic diagram showing the contents of the parsing information 31 obtained as a result of parsing the class definition 11 shown in FIG. 29 by the parsing unit 2.

FIG. 31 exemplifies the declaration addition rule in the generation pattern description 41 for adding the inheritance of the "Element". FIGS. 32, 33, 34 and 35 exemplify the other generation rules of the "Visitor" pattern of the generation pattern description 41.

FIG. 32 exemplifies the declaration addition rule for adding an "accept". FIG. 33 exemplifies the general generation rule when the "Processor" is generated. FIG. 34 exemplifies the declaration addition rule of the inheritance of the "Processor". FIG. 35 exemplifies the declaration addition rule for the function declaration of the "Processor".

Here, the comment added to each class defined in the class definition 11 is recognized by the "comment_check" function in a similar manner as in the above described examples, and the role of the class in the program pattern is determined, and a required addition of inheritance is made.

As described above, a role of a plurality of class definitions and each of the members in the classes in each of the program patterns is provided as a comment, and used as meaningful information in the generation pattern description 41, thereby performing the process for generating a program pattern.

Additionally, when the generation pattern description 41 is made by using the "Visitor" pattern, the "P1" class which is the derived class of the "Processor", performs the necessary process. As a result, all of the derived classes of the "Element" may sometimes request to have the particular member function "void mf( )".

Therefore, the comment "Request_Element_method ('void mf( )')" is added to the "P1" class in the class definition 11.

An auxiliary function definition for verification in order to interpret this comment becomes necessary.

FIG. 36 exemplifies the auxiliary function. This function is used in the generation rule of the generation pattern description 41, in order to determine whether or not the "Element" side satisfies a given condition. Since the "check_method" function shown in FIG. 36 is a function for checking whether or not a duplication of a previously used function exists, it indicates that the member function "void mf( )" is yet to be defined if the result is not "OK".

What is claimed is:

1. A system for automatically generating an object-oriented programming language source program, comprising:

a class definition storing unit to store at least one class definition of a source program written in an object-oriented programming language, the at least one class definition including a comment defining a role of input classes;

a parsing unit to parse contents of a class definition output from said class definition storing unit, and to obtain parsing information;

parsing information storing unit to store said parsing information;

a generation source pattern description storing unit to store a generation source pattern description which describes a correlation between a plurality of classes for generating a source program pattern; and a source program generating unit to automatically generate a new source program by using the parsing information, based on the generation source pattern description and the role of each input class as defined in the comment to provide an additional specification used with the generation source pattern description to control generation of the new source program.

2. The apparatus for automatically generating an object-oriented programming language source program according to claim 1, further comprising:

a generation verifying unit to verify whether the new source program generated in said source program generating unit conflicts with an existing definition.

3. The apparatus for automatically generating an object-oriented programming language source program according to claim 2, wherein said generation verifying unit performs verification by determining whether information in the new source program is duplicated with the parsing information.

4. The apparatus for automatically generating an object-oriented programming language source program according to claim 3, wherein:

the information in the new source program relates to a method and a member which are described in a class included in a generation source pattern in the new source program; and said generation verifying unit comprises a duplicate variable determination unit to determine whether there is duplication of a member variable based on the parsing information in the new source program.

5. The apparatus for automatically generating an object-oriented programming language source program according to claim 3, wherein:

the information in the new source program relates to a method and a member which are described in a class built in a generation source pattern in the new source program; and said generation verifying unit comprises a duplicate variable determination unit to determine whether there is duplication of a method based on the parsing information in the new source program.

6. The apparatus for automatically generating an object-oriented programming language source program according to claim 3, wherein:

the information in the new source program relates to a method and a member which are described in a class included in a generation source pattern in the new source program; and said generation verifying unit comprises a duplicate variable determination unit to determine whether there is duplication of a member due to multiple inheritance, based on the parsing information in the new source program.

7. The apparatus for automatically generating an object-oriented programming language source program according to claim 2, wherein the generation source pattern description includes a description for performing control by said generation verifying unit, so that said source program generating unit does not generate a source program whose description still includes a conflict with an input existing class definition, by using name information of a member variable in the parsing information.

8. The apparatus for automatically generating an object-oriented programming language source program according to claim 2, wherein the generation source pattern description includes a description for performing control by said generation verifying unit, so that said source program generating unit does generate a source program whose description still includes a conflict with an existing class definition which is input also in consideration of multiple definitions of a method, by using name information, information about a number of arguments, and type information of the method in the parsing information.

9. The apparatus for automatically generating an object-oriented programming language source program according to claim 2, wherein the generation source pattern description includes a description for performing control by said generation verifying unit, so that said source program generating unit does not generate a source program whose description still includes a conflict with an existing class definition which is multiple-inherited at the time of execution of the source program, by using information about inheritance in the parsing information.

10. The apparatus for automatically generating an object-oriented programming language source program according to claim 1, wherein said source program generating unit generates a program by using information of a superclass, which is obtained from the parsing information, and distinguishing a source pattern in the generation source pattern description depending on a condition.

11. The apparatus for automatically generating an object-oriented programming language source program according to claim 1, wherein said source program generating unit generates the new source program by using a name and type information of a member variable in a class, which are obtained from the parsing information, and distinguishing a source pattern in the generation source pattern description depending on a condition.

12. The apparatus for automatically generating an object-oriented programming language source program according to claim 4, wherein said source program generating unit generates the new source program by using comment information added to a member in a previous source program, which is obtained from the parsing information.

13. The apparatus for automatically generating an object-oriented programming language source program according to claim 1, wherein said generation source pattern description storing unit stores a description for issuing a warning when an existing inherited definition in a source program to be generated is overwritten, so that said source program generating unit generates the new source program by using information about inheritance of the parsing information obtained by said parsing means.

14. A method for automatically generating an object-oriented programming language source program, comprising:
   obtaining a new definition for generating an object-oriented programming language source program;
   recognizing a generation source pattern description for generating a source program pattern using the new definition; and
   automatically generating a new source program based on the generation source pattern description and a description of a role of each input class extracted from a comment in an inputted class definition of the object-oriented language source program to provide an additional specification used with the generation source pattern description to control generation of the new source program.

15. The method for automatically generating an object-oriented language source program according to claim 14, wherein the new definition includes a definition of a description for a generation rule structure, which represents control structures and functions of input and output, used in the generation pattern description.

16. The method for automatically generating an object-oriented language source program according to claim 15, wherein the new definition includes:
   a definition of a description indicating that a member variable and a method of the object-oriented language are generated or deleted together with an object of a class including the member variable and the method, when a generation or deletion process is performed;
   a definition of a description indicating a comment used in the generation pattern description; and
   a definition of a description indicating a call of a built-in function used in the generation pattern description.

17. The method for a automatically generating an object-oriented language source program according to claim 16, wherein the description indicating that the generation or deletion process is performed together with the object is represented by appending a different symbol to a symbol indicating a comment of the object-oriented language, and describing the member variable or the method after the symbol.

18. The method for automatically generating an object-oriented language source program according to claim 14, further comprising:
   verifying whether definitions of the new source program conflict with definitions of an existing program based on names.

19. A method for automatically generating an object-oriented programming language source program, comprising:
   obtaining parsing information by parsing at least one class definition in a source program written in an object-oriented programming language, the at least one class definition including a description of a role of at least one input class as a comment; and
   automatically generating a new source program by using the parsing information, based on a generation source pattern description, describing a correlation between a plurality of classes, and the description of the role of each input class extracted from the comment to provide an additional specification used with the generation source pattern description to control generation of the new source program.

20. The method for automatically generating an object-oriented programming language source program according to claim 19, further comprising verifying whether a description in the new source program conflicts with an existing definition in the parsing information, at the time of execution of the new source program.

21. A program storage medium storing a program for controlling a computer to perform a process comprising:
   obtaining parsing information by parsing at least one class definition in a source program written in an object-oriented programming language, the at least one class definition including a description of a role of at least one input class as a comment; and
   generating a new source program by using the parsing information, based on a generation source pattern description which describes a correlation between a plurality of classes and the description of the role of each input class extracted from the comment to provide an additional specification used with the generation source pattern description to control generation of the new source program.

22. The program storage medium for storing a program according to claim 21, wherein said process further comprises verifying whether a description in the new source program conflicts with an existing definition in the parsing information.

23. A system to automatically generate a source language computer program, comprising:
   definition storage to store at least one class definition, including a description of a role of each input class as a comment, for a source program in an object-oriented programming language source program;
   pattern storage to store a generation source pattern description specifying a correlation between a plurality of classes to define a source program pattern; and at least one processor, coupled to said definition storage and said pattern storage, programmed to parse contents of the at least one class definition read from said definition storage to obtain parsing information and to generate a new source computer program based on the parsing information and the role of each input class described in the comment which provides an additional specification used with the generation source pattern description to control generation of the new source program.

24. A system to automatically generate a source language computer program, comprising:

a storage unit to store at least one class definition, including a description of a role of each input class as a comment, for a source program in an object-oriented language, a generation source pattern description specifying a correlation between a plurality of classes to define a source program pattern, parsing information and the source computer program upon generation; and at least one processor, coupled to said storage unit, programmed to parse contents of the at least one class definition read from said definition storage to obtain the parsing information and to generate a new source computer program based on the parsing information, the role of each input class described in the comment which provides an additional specification, and the generation source pattern description.

25. A system for automatically generating an object-oriented programming language source program, comprising:

a class definition storing unit to store at least one class definition of a source program written in an object-oriented programming language, at least one of the class definitions including a role of input classes as a comment;

a parsing unit to parse contents of a class definition output from said class definition storing unit, and to obtain parsing information;

a parsing information storing unit to store the parsing information;

a generation source pattern description storing unit to store a generation source pattern description which describes a correlation between a plurality of classes for generating a source program pattern; and a source program generating unit to automatically generate a new source program by using the parsing information based on the generation source pattern description and the role of each input class to provide an additional specification used with the generation source pattern description to control generation of the new source program.

* * * * *

UNITED STATES PATENT AND TRADEMARK OFFICE
CERTIFICATE OF CORRECTION

PATENT NO. : 6,901,579 B1
APPLICATION NO. : 08/840231
DATED : May 31, 2005
INVENTOR(S) : Shigeki Suguta It is certified that error appears in the above-identified patent and that said Letters Patent is hereby corrected as shown below:

Title Page, Col. 1, (Other Publications), line 7, change "Dictionar" to --Dictionary--.

Title Page, Col. 2, (Other Publications), line 6, change "Chaptes" to --Chapters--.

Col. 21, line 52, insert --a-- before "parsing".

Col. 24, line 3, delete "a" after "for".

Signed and Sealed this

First Day of August, 2006

JON W. DUDAS
*Director of the United States Patent and Trademark Office*